United States Patent
Lim et al.

(10) Patent No.: US 11,206,623 B2
(45) Date of Patent: Dec. 21, 2021

(54) METHOD AND DEVICE FOR TRANSMITTING OR RECEIVING FRAME IN WIRELESS LAN SYSTEM

(71) Applicant: LG ELECTRONICS INC., Seoul (KR)

(72) Inventors: Dongguk Lim, Seoul (KR); Eunsung Park, Seoul (KR); Jinyoung Chun, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 16/643,428

(22) PCT Filed: Aug. 24, 2018

(86) PCT No.: PCT/KR2018/009829
§ 371 (c)(1),
(2) Date: Feb. 28, 2020

(87) PCT Pub. No.: WO2019/045380
PCT Pub. Date: Mar. 7, 2019

(65) Prior Publication Data
US 2020/0367181 A1  Nov. 19, 2020

Related U.S. Application Data

(60) Provisional application No. 62/551,769, filed on Aug. 29, 2017, provisional application No. 62/557,165, (Continued)

(51) Int. Cl.
*H04W 56/00* (2009.01)
*H04W 84/12* (2009.01)

(52) U.S. Cl.
CPC ............ *H04W 56/00* (2013.01); *H04W 84/12* (2013.01)

(58) Field of Classification Search
CPC .. H04W 56/00; H04W 84/12; H04L 27/2602; H04L 27/2613
See application file for complete search history.

(56) References Cited

U.S. PATENT DOCUMENTS

2013/0128807 A1* 5/2013 Vermani ............. H04L 27/2602
370/328
2015/0282068 A1 10/2015 Rajagopal et al.
(Continued)

OTHER PUBLICATIONS

PCT International Application No. PCT/KR2018/009829, International Search Report dated Dec. 4, 2018, 2 pages.
(Continued)

*Primary Examiner* — Mohammad S Anwar
(74) *Attorney, Agent, or Firm* — Lee, Hong, Degerman, Kang & Waimey PC

(57) ABSTRACT

A method for receiving a WUR PPDU in WLAN by an STA according to an embodiment of the present invention may comprise the steps of: receiving a WUR PPDU including a WUR preamble and a payload; acquiring information on a data rate applied to the payload, on the basis of a synchronization sequence of the WUR preamble; and decoding the payload on the basis of the information on the data rate, wherein the STA determines that the data rate applied to the payload is 250 kbps when the synchronization sequence is a first sequence having a length of 32 bits, and determines that the data rate applied to the payload is 62.5 kbps when the synchronization sequence is a second sequence having a length of 64 bits.

8 Claims, 24 Drawing Sheets

Related U.S. Application Data filed on Sep. 12, 2017, provisional application No. 62/557,710, filed on Sep. 12, 2017.

(56) References Cited

U.S. PATENT DOCUMENTS

| | | | |
|---|---|---|---|
| 2016/0323056 A1* | 11/2016 | Park | H04J 13/0022 |
| 2016/0337973 A1 | 11/2016 | Park et al. | |
| 2016/0374018 A1 | 12/2016 | Min et al. | |
| 2018/0295578 A1* | 10/2018 | Liu | H04W 52/0235 |
| 2019/0007904 A1* | 1/2019 | Asterjadhi | H04W 12/106 |
| 2019/0059055 A1* | 2/2019 | Murali | H04W 52/0229 |

OTHER PUBLICATIONS

LG Electronics, "Signaling Method for Multiple Data Rate," IEEE 802.11-17/963r0, Jul. 2017, 20 pages.

LG Electronics, "Multiple Data Rates for WUR," IEEE 802.11-17/0654r3, May 2017, 26 pages.

* cited by examiner (a)

(b)

(a)

(b)

(a)

(b)

(c)

(a)

(b)

METHOD AND DEVICE FOR TRANSMITTING OR RECEIVING FRAME IN WIRELESS LAN SYSTEM

CROSS-REFERENCE TO RELATED APPLICATIONS

This application is the National Stage filing under 35 U.S.C. 371 of International Application No. PCT/KR2018/009829, filed on Aug. 24, 2018, which claims the benefit of U.S. Provisional Application No. 62/551,769, filed on Aug. 29, 2017, 62/557,165, filed on Sep. 12, 2017, and 62/557,710, filed on Sep. 12, 2017, the contents of which are all hereby incorporated by reference herein in their entirety.

BACKGROUND OF THE DISCLOSURE

Field of the Disclosure

The present disclosure relates to a wireless LAN system and, most particularly, to a method for transmitting or receiving a PPDU through wake-up radio (WUR) and a device for the same.

Related Art

A standard for the wireless LAN technology is being developed as an Institute of Electrical and Electronics Engineers (IEEE) 802.11 standard. IEEE 802.11a and b use an unlicensed band in 2.4 GHz or 5 GHz. And, IEEE 802.11b provides a transmission rate of 11 Mbps, and IEEE 802.11a provides a transmission rate of 54 Mbps. And, IEEE 802.11g provides a transmission rate of 54 Mbps by applying orthogonal frequency-division multiplexing (OFDM). IEEE 802.11n provides a transmission rate of 300 Mbps on 4 spatial streams by applying multiple input multiple output-OFDM (MIMO-OFDM). The IEEE 802.11n supports a channel bandwidth of up to 40 MHz, and, in this case, the IEEE 802.11n provides a transmission rate of 600 Mbps.

The above-described wireless LAN (WLAN) standard was previously defined as the IEEE 802.11ac standard, which uses a maximum bandwidth of 160 MHz, supports 8 spatial streams, and supports a maximum rate of 1 Gbit/s. And, discussions are now being made on the IEEE 802.11ax standardization.

SUMMARY OF THE DISCLOSURE

Technical Objects

An object that is to be achieved by the present disclosure is to provide a method for efficiently and accurately transmitting or receiving a WUR PPDU in an environment where multiple data rates are supported and a device for the same.

The present disclosure will not be limited only to the aforementioned technical object. And, other technical objects may be inferred from the embodiments of the present disclosure.

Technical Solutions

In order to achieve the above-described technical object, according to an aspect of the present disclosure, a method for receiving a wake-up radio (WUR) physical layer protocol data unit (PPDU), by a station (STA), in a wireless LAN (WLAN), may include the steps of receiving a WUR PPDU including a WUR preamble and a payload, obtaining information on a data rate being applied to the payload based on a synchronization sequence of the WUR preamble, and decoding the payload based on the information on the data rate, wherein, in case the synchronization sequence is a first sequence having a 32-bit length, the STA may determine the data rate being applied to the payload as 250 kbps, and, in case the synchronization sequence is a second sequence having a 64-bit length, the STA may determine the data rate being applied to the payload as 62.5 kbps.

In order to achieve the above-described technical object, according to another aspect of the present disclosure, a station (STA) for receiving a wake-up radio (WUR) physical layer protocol data unit (PPDU) in a wireless LAN (WLAN) may include a WUR receiver; and a processor receiving a WUR PPDU including a WUR preamble and a payload through the WUR receiver, obtaining information on a data rate being applied to the payload based on a synchronization sequence of the WUR preamble, and decoding the payload based on the information on the data rate, wherein, in case the synchronization sequence is a first sequence having a 32-bit length, the processor may determine the data rate being applied to the payload as 250 kbps, and, in case the synchronization sequence is a second sequence having a 64-bit length, the processor may determine the data rate being applied to the payload as 62.5 kbps.

The STA may assume a length of 1 symbol in the WUR preamble as 2 us regardless of whether the data rate being applied to the payload is 250 kbps or 62.5 kbps.

In case the data rate being applied to the payload is 250 kbps, a length of the WUR preamble may be equal to 64 us, and, in case the data rate being applied to the payload is 62.5 kbps, a length of the WUR preamble may be equal to 128 us.

The first sequence having the 32-bit length may be a sequence capable of being obtained by using part of the second sequence having the 64-bit length.

A part of the second sequence may be a left half of the second sequence or a right half of the second sequence.

The STA may differently assume the length of 1 symbol in the payload based on whether the data rate being applied to the payload is 250 kbps or 62.5 kbps and may decode the payload.

In order to achieve the above-described technical object, according to another aspect of the present disclosure, a method for transmitting a wake-up radio (WUR) physical layer protocol data unit (PPDU), by an access point (AP), in a wireless LAN (WLAN) may include the steps of determining a data rate intended to be applied to a payload of a WUR PPDU, configuring a synchronization sequence of a WUR preamble based on the determined data rate, and transmitting the WUR PPDU including the WUR preamble and the payload, wherein, in case the data rate being applied to the payload is 250 kbps, the AP may configure a first sequence having a 32-bit length as the synchronization sequence, and, in case the data rate being applied to the payload is 62.5 kbps, the AP may configure a second sequence having a 64-bit length as the synchronization sequence.

In order to achieve the above-described technical object, according to another aspect of the present disclosure, an access point (AP) for transmitting a wake-up radio (WUR) physical layer protocol data unit (PPDU) in a wireless LAN (WLAN) may include a transmitter, and a processor determining a data rate intended to be applied to a payload of a WUR PPDU, configuring a synchronization sequence of a WUR preamble based on the determined data rate, and transmitting the WUR PPDU including the WUR preamble and the payload through the transmitter, wherein, in case the data rate being applied to the payload is 250 kbps, the processor may configure a first sequence having a 32-bit length as the synchronization sequence, and, in case the data rate being applied to the payload is 62.5 kbps, the processor may configure a second sequence having a 64-bit length as the synchronization sequence.

The AP may configure a length of 1 symbol in the WUR preamble as 2 us regardless of whether the data rate being applied to the payload is 250 kbps or 62.5 kbps.

In case the data rate being applied to the payload is 250 kbps, a length of the WUR preamble may be equal to 64 us, and, in case the data rate being applied to the payload is 62.5 kbps, a length of the WUR preamble may be equal to 128 us.

The first sequence having the 32-bit length may be a sequence capable of being obtained by using part of the second sequence having the 64-bit length.

A part of the second sequence may be a left half of the second sequence or a right half of the second sequence.

The AP may differently configure the length of 1 symbol in the payload based on whether the data rate being applied to the payload is 250 kbps or 62.5 kbps.

Effects of the Disclosure

According to an embodiment of the present disclosure, since a synchronization sequence of a WUR preamble is configured differently based on a data rate of a payload, if the STA detects a synchronization sequence during a synchronization procedure, the STA may also be capable of determining the data rate of a payload. Thus, a WUR PPDU may be transmitting and/or received more accurately and efficiently in an environment where multiple data rates are supported.

Apart from the aforementioned technical effect(s), other technical effects may be inferred from the embodiments of the present disclosure.

DESCRIPTION OF EXEMPLARY EMBODIMENTS

Hereinafter, the preferred embodiment of the present disclosure will be described in detail with reference to the appended drawings. The detailed description that will hereinafter be disclosed along with the appended drawings will only be provided to describe an exemplary embodiment of the present disclosure. And, therefore, it should be understood that the exemplary embodiment presented herein will not represent the only embodiment for carrying out the present disclosure.

The following detailed description includes specific details for providing a full understanding of the present disclosure. However, it will be apparent to anyone skilled in the art that the present disclosure can be carried out without referring to the above-mentioned specific details. In some cases, in order to avoid any ambiguity in the concept of the present disclosure, the disclosed structure and device may be omitted, or the disclosed structure and device may be illustrated as a block diagram based on their core functions.

As described above, the following description relates to a method for efficiently utilizing a channel with a wide band in a wireless LAN (WLAN) system, and a device for the method. To this end, the WLAN system to which the present disclosure is applied will be described in detail.

Figure 1:
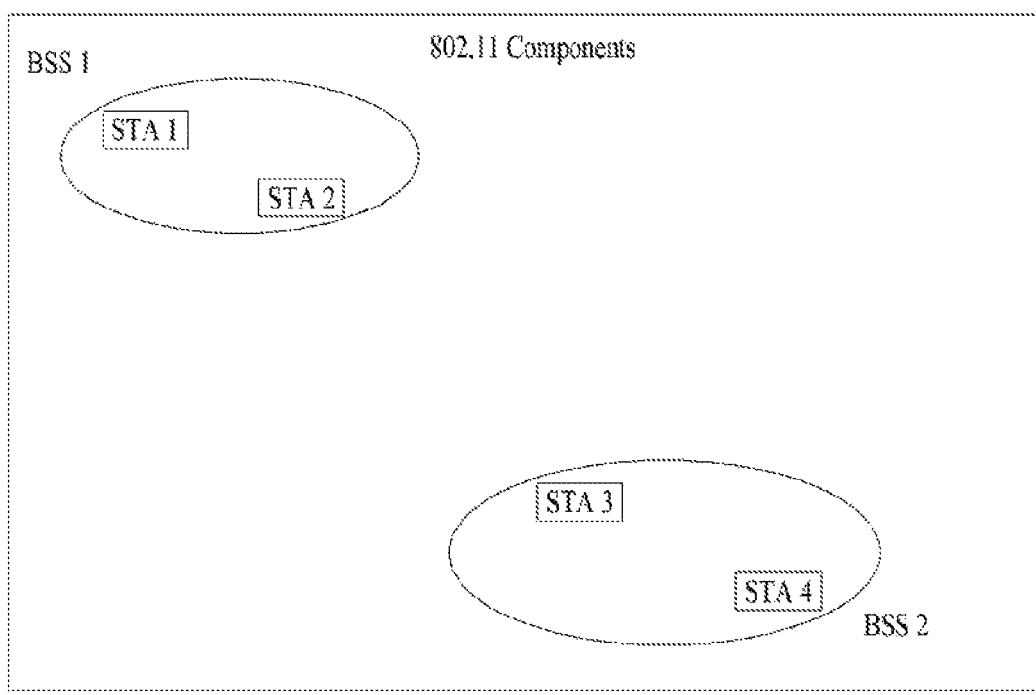
FIG. 1 is a diagram showing an exemplary configuration of a wireless LAN (WLAN) system.

FIG. 1 is a diagram showing an exemplary configuration of a wireless LAN (WLAN) system.

As shown in FIG. 1, a wireless LAN (WLAN) includes one or more Basic Service Set (BSS). A BSS is a set (or group) of stations (STAs) that successfully achieve synchronization so as to communication with one another.

As a logical entity including a Medium Access Control (MAC) and a Physical Layer interface for a wireless medium, an STA includes an access point (AP) and a non-AP Station. Among the STAs, a portable device (or terminal) that is operated by a user is a non-AP Station. And, therefore, when an entity is simply mentioned to as an STA, the STA may also refer to a non-AP Station. Herein, the non-AP Station may also be referred to as other terms, such as a terminal, a wireless transmit/receive unit (WTRU), a user equipment (UE), a mobile station (MS), a mobile terminal, a mobile subscriber unit, and so on.

Additionally, the AP is an entity providing its associated station (STA) with an access to a distribution system (DS) through a wireless medium. Herein, the AP may also be referred to as a centralized controller, a base station (B), a Node-B, a base transceiver system (BTS), a personal basic service set central point/access point (PCP/AP), a site controller, and so on.

A BSS may be categorized as an infrastructure BSS and an independent BSS (IBSS).

The BSS shown in FIG. 1 is an IBSS. The IBSS refers to a BSS that does not include an AP. And, since the BSS does not include an AP, access to the DS is not authorized (or approved), and, therefore, the IBSS functions as a self-contained network.

Figure 2:
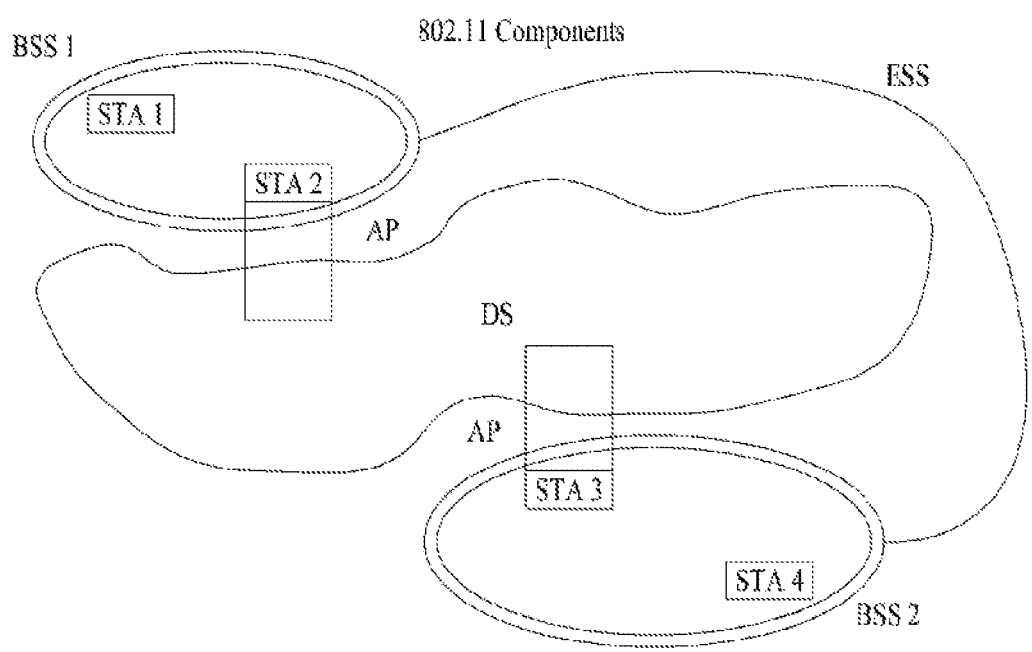
FIG. 2 is a diagram showing another exemplary configuration of a wireless LAN (WLAN) system.

FIG. 2 is a diagram showing another exemplary configuration of a wireless LAN (WLAN) system.

The BSS shown in FIG. 2 is an infrastructure BSS. The infrastructure BSS includes one or more STAs and APs. As a rule, although the communication between non-AP STAs is established by passing through the AP, in case a direct link is configured between the non-AP STAs, direct communication may also be established between the non-AP STAs.

As shown in FIG. 2, a plurality of infrastructure BSSs may be interconnected to one another through the DS. The plurality of BSSs being interconnected to one another through the DS is collectively referred to as an extended service set (ESS). The STAs being included in the ESS may perform communication between one another, and, a non-AP STA may shift (or relocate) from one BSS to another BSS within the same ESS while performing uninterrupted communication.

As a mechanism that connects the plurality of APs, the DS is not necessarily required to be a network. As long as the DS is capable of providing a predetermined distribution service, there is no limitation in the structure or configuration of the DS. For example, the DS may be a wireless network, such as a mesh network, or the DS may be a physical structure (or entity) that connects the APs to one another.

Layer Structure

An operation of an STA operating in a WLAN system may be described in terms of a layer structure. The layer structure may be implemented by a processor in terms of a device configuration. The STA may have a multi-layer structure. For example, a layer structure in the 802.11 standard document is a MAC sublayer and a physical (PHY) layer on a data link layer (DLL). The PHY layer may include a physical layer convergence procedure (PLCP) entity, a physical medium dependent (PMD) entity, or the like. The MAC sublayer and the PHY layer include management entities referred to as a MAC sublayer management entity (MLME) and a physical layer management entity (PLME), respectively. Those entities provide a layer management service interface in which a layer management function operates.

In order to provide an accurate MAC operation, a station management entity (SME) exists in each STA. The SME is a layer-independent entity which may be present in a separate management plane or which may be seen to be off to the side. Although accurate functions of the SME are not described in detail in the present document, in general, it may be seen that the functions are for collecting a layer-dependent state from various layer management entities (LMEs), for setting layer-specific parameters to have similar values, or the like. In general, the SME may perform those functions on behalf of a general system management entity, and may implement a standard management protocol.

The aforementioned entities interact in various manners. For example, the interaction between the entities may be achieved by exchanging GET/SET primitives. The primitive implies a set of parameters or elements related to a specific purpose. An XX-GET.request primitive is used to request for a value of a given MIB attribute (attribute information based on management information). An XX-GET.confirm primitive is used to return a proper MIB attribute information value if a status is "success", and otherwise to return an error indication in a status field. An XX-SET.request primitive is used such that an indicated MIB attribute is set to a given value. When the MIB attribute implies a specific operation, it is a request for performing the operation. In addition, an XX-SET.confirm primitive is used to confirm that an indicated MIB attribute is set to a requested value if a status is "success", and otherwise to return an error condition in a status field. When the MIB attribute implies a specific operation, it is confirmed that the operation has been performed.

In addition, the MLME and the SME may exchange various MLME_GET/SET primitives through an MLME_Service Access Point (SAP). In addition, the various PLME_GET/SET primitives may be exchanged between the PLME and the SME through the PLME_SAP, and may be exchanged between the MLME and the PLME through the MLME-PLME_SAP.

Link Setup Process

Figure 3:
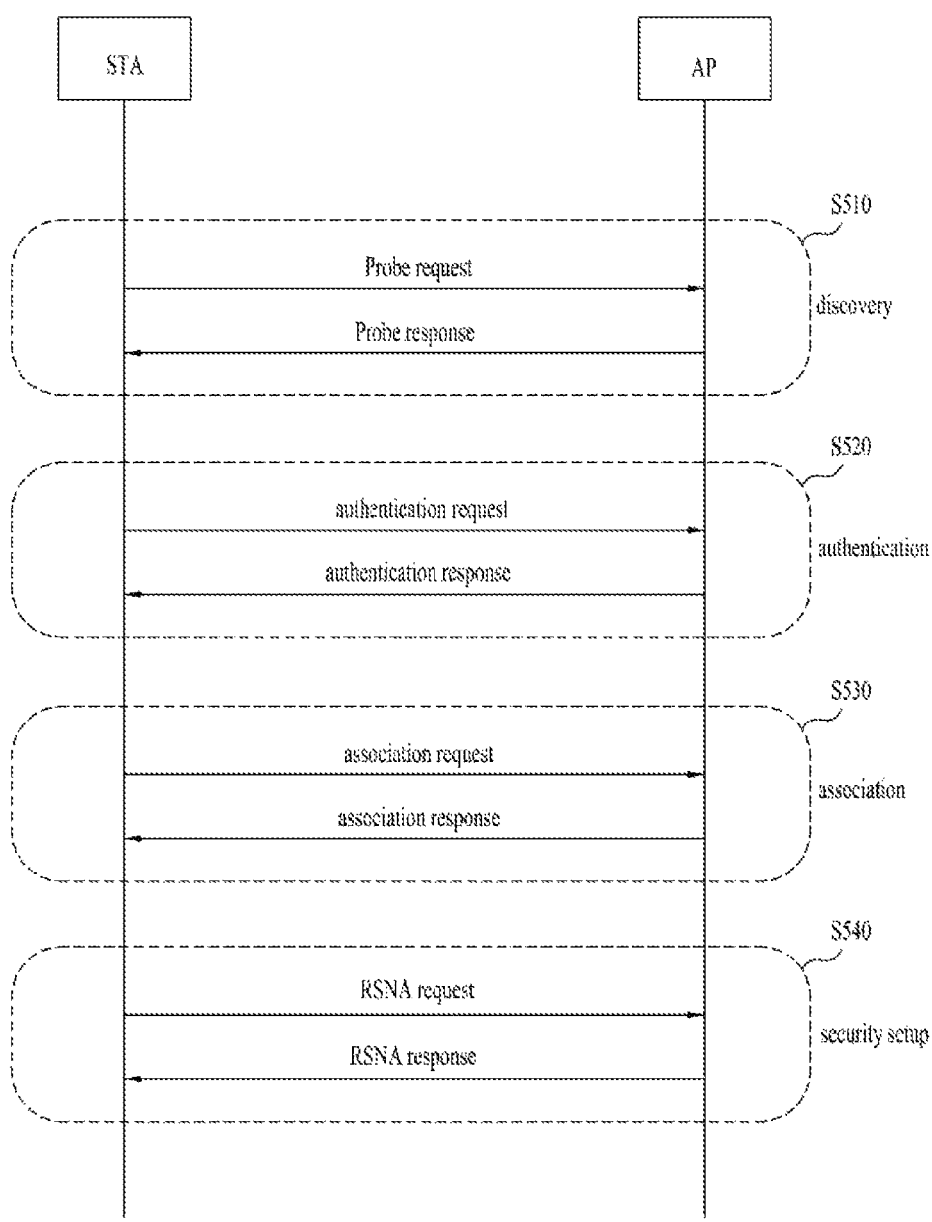
FIG. 3 is a drawing for explaining a general link setup process.

FIG. 3 is a drawing for explaining a general link setup process.

In order for an STA to set up a link for a network, the STA shall first discover the network, perform authentication, establish an association, and be subjected to an authentication procedure or the like for security. The link setup process may be referred to as a session initiation process or a session setup process. In addition, the process of discovery, authentication, association, and security configuration of the link setup process may be collectively referred to as an association process.

Referring to FIG. 3, an exemplary link setup process will be described.

In step S510, an STA may perform a network discovery operation. The network discovery operation may include a scanning operation of the STA. That is, a joinable network shall be found in order for the STA to have access to the network. The STA shall identify a compatible network before joining a wireless network, and a process of identifying a network existing in a specific region is called scanning.

The scanning includes active scanning and passive scanning.

The network discovery operation including the active scanning process is shown as an example in FIG. 3. In the active scanning, an STA performing the scanning transmits a probe request frame to discover a nearby AP while moving between channels, and waits for a response thereto. In response to the probe request frame, a responder transmits a probe response frame to the STA which has transmitted the probe request frame. Herein, the responder may be an STA which has lastly transmitted a beacon frame in a BSS of a channel being scanned. In the BSS, an AP is the responder since the AP transmits the beacon frame. In an IBS S, the responder is not constant since STAs in the IBSS transmit the beacon frame in turn. For example, an STA which has transmitted a probe request frame in a channel #1 and has received a probe response frame in the channel #1 may store BSS-related information included in the received probe response frame and move to a next channel (e.g., a channel #2) to perform scanning (i.e., probe request/response transmission and reception on the channel #2) in the same manner.

Although not shown in FIG. 3, the scanning operation may be performed in a passive scanning manner. In the passive scanning, an STA performing the scanning waits for a beam frame while moving between channels. The beacon frame is one of management frames in IEEE 802.11, and is transmitted periodically to report the existence of a wireless network and to allow the STA performing scanning to find the wireless network so as to join the wireless network. In the BSS, an AP serves to periodically transmit the beacon frame. In the IBSS, STAs in the IBSS transmit the beacon frame in turn. The STA performing scanning stores the BSS-related information included in the beacon frame while receiving the beacon frame, and records beacon frame information in each channel while moving to another channel. An STA which has received the beacon frame may store the BSS-related information included in the received beacon frame, and may move to a next channel to perform scanning in the next channel in the same manner.

Comparing the active scanning and the passive scanning, advantageously, the active scanning has less delay and power consumption than the passive scanning.

After the STA discovers the network, an authentication process may be performed in step S520. The authentication process may be referred to as a first authentication process in order to clearly distinguish from a security setup operation of step S540 described below.

The authentication process includes a process in which the STA transmits an authentication request frame to the AP, and the AP transmits an authentication response frame to the STA in response thereto. The authentication frame used in the authentication request/response corresponds to a management frame.

The authentication frame may include information on an authentication algorithm number, an authentication transaction sequence number, a status code, a challenge text, a robust security network (RSN), a finite cyclic group, or the like. This information corresponds to some examples of information which may be included in the authentication request/response frame, and may be replaced with different information, or additional information may be further included.

The STA may transmit the authentication request frame to the AP. The AP may determine whether to accept authentication for a corresponding STA based on information included in the received authentication request frame. The AP may provide an authentication processing result to the STA through the authentication response frame.

After the STA is successfully authenticated, an association process may be performed in step S530. The association process includes a process in which the STA transmits an association request frame to the AP, and the AP transmits an association response frame to the STA in response thereto.

For example, the association request frame may include information related to various capabilities, a beacon listen interval, a service set identifier (SSID), supported rates, supported channels, RSN, a mobility domain, supported operating classes, a traffic indication map (TIM) broadcast request, an interworking service capability, or the like.

For example, the association response frame may include information related to various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BBS scan parameter, a TIM broadcast request, a QoS map, or the like.

This information corresponds to some examples of information which may be included in the association request/response frame, and may be replaced with different information, or additional information may be further included.

After the STA is successfully related to the network, a security setup process may be performed in step S540. The security setup process of step S540 may be referred to as an authentication process through a robust security network association (RSNA) request/response. The authentication process of step S520 may be referred to as a first authentication process. The security setup process of step S540 may be simply referred to as an authentication process.

The security setup process of step S540 may include a private key setup process through 4-way handshaking by using, for example, an extensible authentication protocol over LAN (EAPOL) frame. In addition, the security setup process may be performed according to a security scheme not defined in the IEEE 802.11 standard.

Medium Access Mechanism

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. According to this type of access mechanism, an AP and/or an STA may perform clear channel assessment (CCA) which senses a medium or a wireless channel during a specific time duration (e.g., DCF inter-frame space (DIFS)) before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration (e.g., a random backoff period) for medium access. By applying the random backoff period, it is expected that several STAs attempt to transmit a frame after waiting for different time durations, thereby minimizing a collision.

In addition, the IEEE 802.11 MAC protocol provides a hybrid coordination function (HCF). The HCF is based on the DCF and a point coordination function (PCF). The PCF is a polling-based synchronous access scheme in which polling is periodically performed so that all receiving APs and/or STAs can receive data frames. In addition, the HCF may have enhanced distributed channel access (EDCA) and HCF controlled channel access (HCCA). The EDCA is a contention based access scheme for providing a data frame to a plurality of users, and the HCCA is a contention-free based channel access scheme using a polling mechanism. In addition, the HCF may include a medium access mechanism for improving a quality of service (QoS) of the WLAN, and may transmit QoS data in both a contention period (CP) and a contention-free period (CFP).

Figure 4:
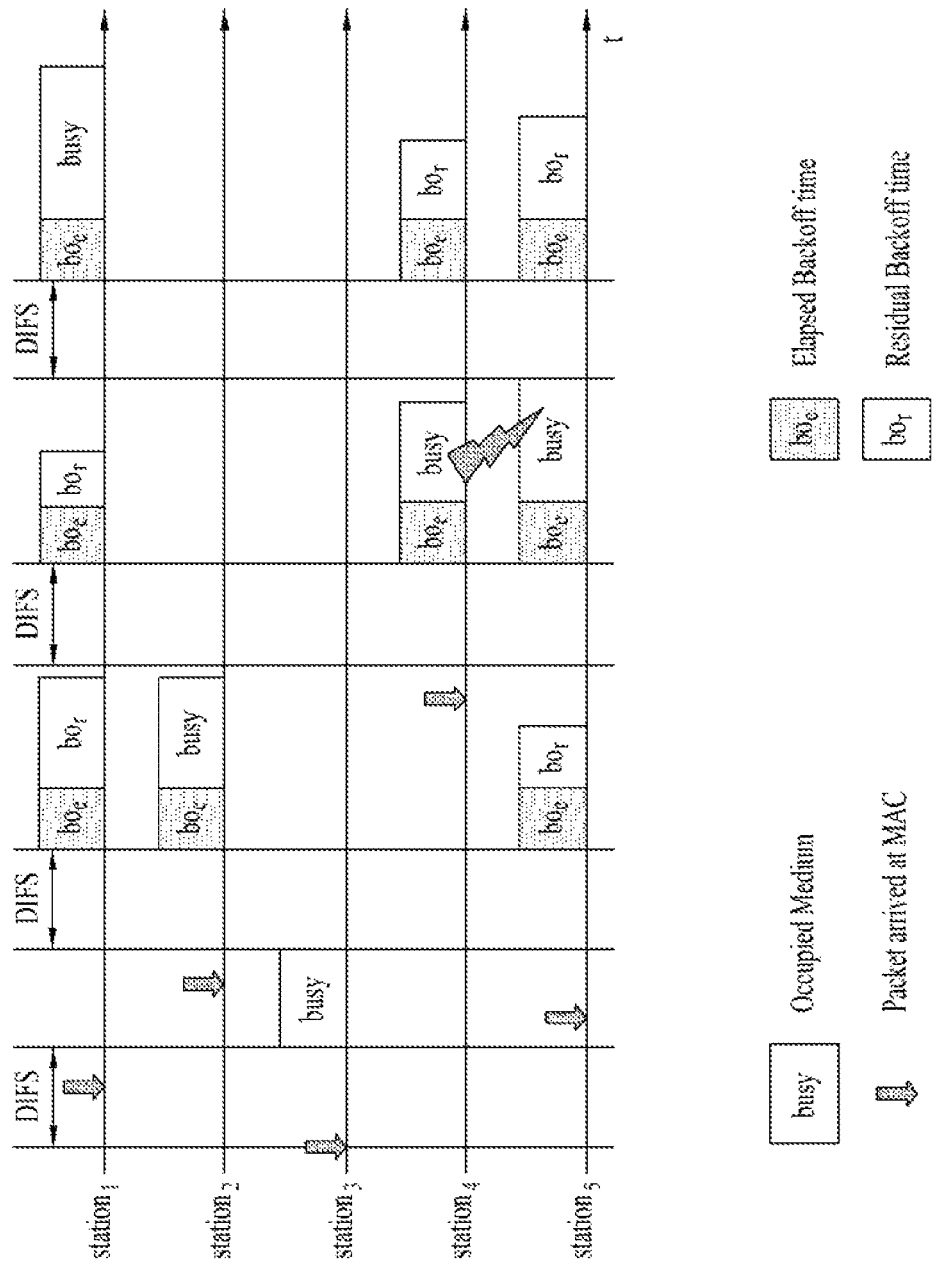
FIG. 4 is a drawing for explaining a backoff process.

FIG. 4 is a drawing for explaining a backoff process.

An operation based on a random backoff period will be described with reference to FIG. 4. When a specific medium is changed from an occupied (or busy) status to an idle status, several STAs may attempt data (or frame) transmission. In this case, as a method for minimizing a collision, each of the STAs may select a random backoff count and may attempt transmission after waiting for a corresponding time slot. The random backoff count may have a packer number value, and may be determined as one of values in the range of 0 to CW. Herein, the CW is a contention window parameter value. The CW parameter has an initial value given as CWmin, but may take a value two times higher than that if transmission fails (e.g., if ACK is not received for a transmitted frame). If the CW parameter value is CWmax, data transmission may be attempted while maintaining CWmax until data transmission is successful, and if data transmission is successful, the value is reset to CWmin. The values CW, CWmin, and CWmax are preferably set to $2^n-1$ (n=0, 1, 2, . . . ).

When the random backoff process starts, the STA continuously monitors a medium during counting down a backoff slot according to the determined backoff count value. When the medium is monitored in the busy status, the STA stops the countdown and waits. When the medium is monitored in the idle status, the STA resumes the countdown.

Figure 6:
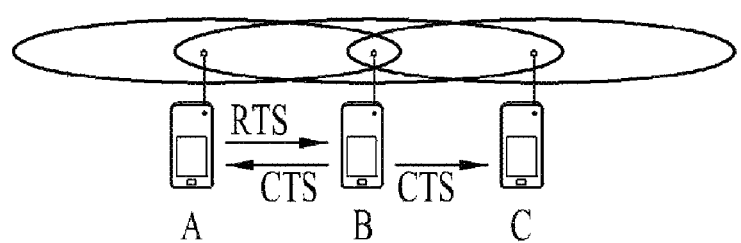
FIG. 6 is a drawing for explaining RTS and CTS.
Figure 6:
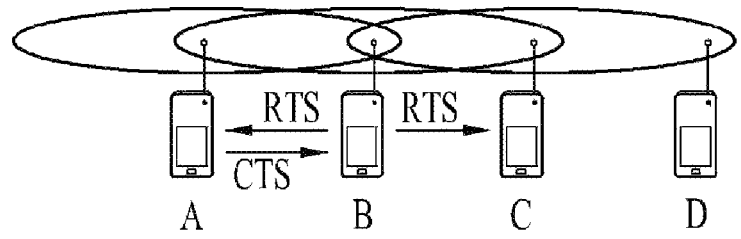

In the example of FIG. 4, upon arrival of a packet to be transmitted to MAC of an STA 3, the STA3 may transmit a frame immediately after identifying that the medium is idle for a time of DIFS. Meanwhile, the remaining STAs may monitor that the medium is in the busy status and may wait. In the meantime, data to be transmitted may be generated in each of STAs 1, 2, and 5. Each STA may wait for the DIFS when the medium is monitored in the idle status, and thereafter may count down a backoff slot according to a random backoff time selected by each STA. The example of FIG. 4 shows a case where the STA2 selects a shortest backoff time, and the STA1 selects a longest backoff count value. That is, it is shown that a residual backoff time of the STA5 is shorter than a residual backoff time of the STA1 at a time when the STA2 finishes backoff counting for the selected random backoff time and starts frame transmission. The STA1 and the STA5 stop the countdown and waits during the STA2 occupies a medium. When the medium occupancy of the STA2 is finished and thus the medium is in the idle status again, the STA1 and the STA5 resume the countdown for the residual backoff time which has stopped after waiting for the DIFS. That is, frame transmission may start after counting down the residual backoff slot corresponding to the residual backoff time. Since the STA5 has a shorter residual backoff time than the STA1, the STA5 starts frame transmission. Meanwhile, data to be transmitted may be generated also in the STA4 during the STA2 occupies the medium. In this case, the STA4 may wait for the DIFS when the medium is in the idle status, and thereafter may perform the countdown based on the random backoff count value selected by the STA4 and may start frame transmission. The example of FIG. 6 shows a case where the residual backoff time of the STA5 incidentally coincides with the random backoff time of the STA4. In this case, a collision may occur between the STA4 and the STA5. When the collision occurs, both the STA4 and the STA5 cannot receive ACK, which leads to a failure in data transmission. In this case, the STA4 and the STA5 may double a CW value and then select the random backoff count value, and may perform the countdown. Meanwhile, the STA1 may wait during a medium is in the busy state due to transmission of the STA4 and the STA5, and when the medium is in the idle status, may wait for DIFS and thereafter may transmit a frame at the expiry of the residual backoff time.

Sensing Operation of STA

As described above, a CSMA/CA mechanism includes virtual carrier sensing as well as physical carrier sensing in which an AP and/or an STA directly senses a medium. The virtual carrier sensing is intended to compensate for a problem which may occur on medium access such as a hidden node problem or the like. For the virtual carrier sensing, MAC of a WLAN system may use a network allocation vector (NAV). The NAV is a value used by an AP and/or STA, which is currently using a medium or has a right to use it, to indicate a remaining time until the medium is in an available state to another AP and/or STA. Therefore, the value which is set to the NAV corresponds to an interval scheduled to use the medium by an AP and/or STA for transmitting a corresponding frame, and an STA receiving the NAV value is prohibited from accessing the medium during the interval. The NAV may be set, for example, according to a value of a "duration" field of a MAC header of the frame.

In addition, a robust collision detection mechanism has been introduced to reduce the possibility of collision. This will be described with reference to FIG. 5 and FIG. 7. Although a carrier sensing range may not be actually identical to a transmission range, it is assumed that they are identical to each other for convenience of explanation.

Figure 5:
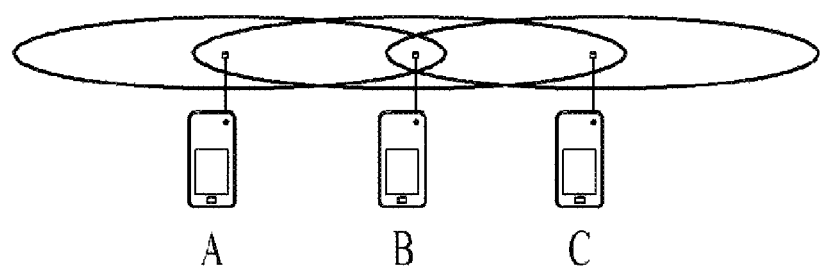
FIG. 5 is a diagram for explaining a hidden node and an exposed node.
Figure 5:
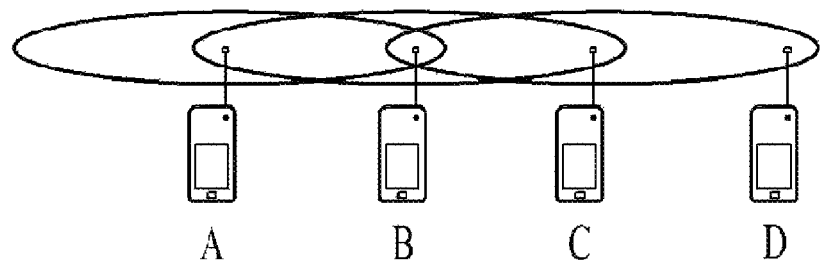

FIG. 5 is a diagram for explaining a hidden node and an exposed node.

FIG. 5(a) is an example of a hidden node when an STA A communicates with an STA B, and an STA C has information to be transmitted. Specifically, although it is a situation where the STA A transmits information to the STA B, it may be determined that a medium is in an idle status when the STA C performs carrier sensing before transmitting data to the STA B. This is because transmission (e.g., medium occupancy) of the STA A may not be sensed at a location of the STA C. In this case, the STA B simultaneously receives information of the STA A and the STA C, which results in a collision. In this case, the STA A may be referred to as a hidden node of the STA C.

FIG. 5(b) is an example of an exposed node when an STA C has information to be transmitted from an STA D in a situation where and an STA B transmits data to an STA A. In this case, when the STA C performs carrier sensing, it may be determined as a state where a medium is occupied due to transmission of the STA B. Accordingly, even if the STA C has information to be transmitted to the STA D, since an occupied status of the medium is sensed, waiting is required until the medium becomes an idle status. However, since the STA A is actually out of a transmission range of the STA C, transmission from the STA C and transmission from the STA B may not collide with each other from a perspective of the STA A. Therefore, the STA C unnecessarily waits until the STA B stops transmission. In this case, the STA C may be referred to as an exposed node of the STA B.

FIG. 6 is a drawing for explaining RTS and CTS.

In order to efficiently utilize a collision avoidance mechanism in an exemplary situation of FIG. 5, a short signaling packet such as request to send (RTS) and clear to send (CTS) or the like may be utilized. The RTS/CTS between two STAs may allow overhearing of nearby STA(s), thereby allowing the nearby STA(s) to consider whether to transmit information between the two STAs. For example, when an STA intending to transmit data transmits an RTS frame to an STA for receiving data, the STA for receiving data may transmit the CTS frame to the nearby STAs to report that the STA will receive data.

FIG. 6(a) is an example of a method for solving a hidden node problem when both an STA A and an STA C intend to transmit data to an STA B. When the STA A sends RTS to the STA B, the STA B transmits CTS to both the STA A and STA C located around the STA B. As a result, the STA C waits until the STA A and the STA B stop data transmission, thereby avoiding a collision.

FIG. 6(b) is an example of a method of solving an exposed hidden problem. Since an STA C overhears RTS/CTS transmission between an STA A and an STA B, the STA C may determine that a collision will not occur even if the STA C transmits data to another STA (e.g., an STA D). That is, the STA B transmits RTS to all nearby STAs, and only the STA A having data to be actually transmitted transmits CTS. The STA C receives only the RTS and does not receive the CTS of the STA A, and thus can know that the STA A is located out of a carrier sensing range of the STA C.

Power Management

In the aforementioned WLAN system, an STA has to perform channel sensing before performing transmission/reception, which causes persistent power consumption of the STA. Power consumption in a reception state is not significantly different from power consumption in a transmission state, and maintaining the reception state persistently is a great burden to an STA with limited power (i.e., operating by a battery). Therefore, if the STA maintains a reception waiting state to persistently sense a channel, power may be inefficiently consumed without a special benefit in terms of a WLAN throughput. In order to solve such a problem, the WLAN system supports a power management (PM) mode of the STA.

The PM mode of the STA is divided into an active mode and a power save (PS) mode. The STA operates in the active mode by default. The STA operating in the active mode maintains an awake state. The awake state is a state where a normal operation such as frame transmission/reception, channel scanning, or the like is possible. Meanwhile, an STA operating in the PS mode operates while switching a sleep state (or doze state) and the awake state. The STA operating in the sleep state operates with minimum power, and does not perform channel scanning not to mention frame transmission/reception.

Power consumption decreases when the STA operates in the sleep state as long as possible, and thus an operating duration of the STA increases. However, since frame transmission/reception is impossible in the sleep state, it is not possible to operate unconditionally for long. In the presence of a frame to be transmitted to the AP by the STA operating in the sleep state, a frame may be transmitted by switching to the awake state. Meanwhile, in the presence of a frame to be transmitted to the STA by the AP, the STA in the sleep state cannot receive this and cannot know the presence of the frame to be received, either. Therefore, the STA may require an operation of switching to the awake state according to a specific period in order to know whether there is a frame to be transmitted to the STA (or in order to receive the frame in the presence of the frame).

The AP may transmit a beacon frame to the STAs in a BSS with a specific period. A traffic indication map (TIM) information element may be included in the beacon frame. The TIM information element may include information indicating that the AP has buffered traffic for STAs related to the AP and will transmit the frame. An example of the TIM element includes a TIM used to report a unicast frame and a delivery traffic indication map (DTIM) used to report a multicast or broadcast frame.

Figure 7:
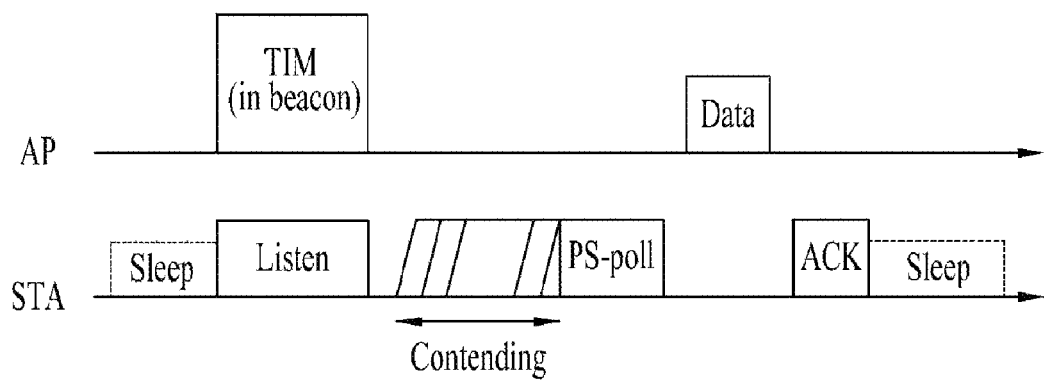
FIG. 7 to FIG. 9 are drawings for explaining in detail an operation of an STA which has received a TIM.
Figure 8:
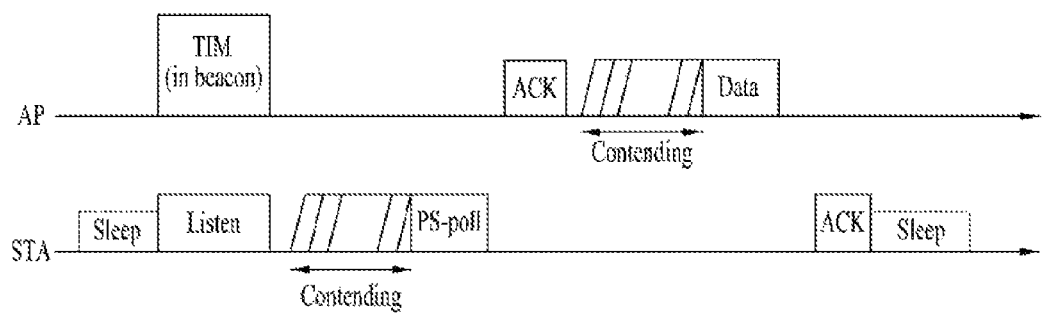
Figure 9:
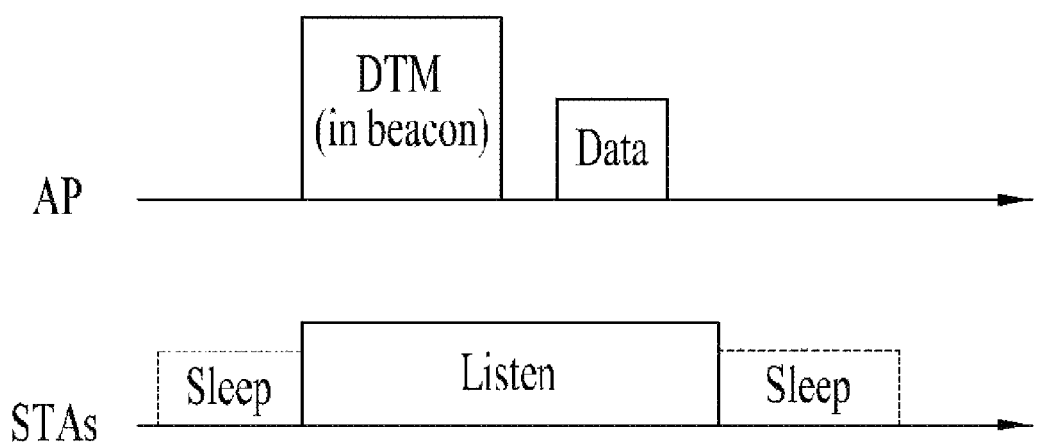

FIG. 7 to FIG. 9 are drawings for explaining in detail an operation of an STA which has received a TIM.

Referring to FIG. 7, in order to receive a beacon frame including a TIM from an AP, an STA may switch from a sleep state to an awake state, and may interpret a received TIM element to know that there is buffered traffic to be transmitted to the STA. After contending with other STAs to access a medium for PS-poll frame transmission, the STA may transmit a PS-poll frame to request the AP to transmit a data frame. The AP which has received the PS-poll frame transmitted by the STA may transmit the frame to the STA. The STA may receive a data frame and transmit an ACK frame for this to the AP. Thereafter, the STA may switch back to the sleep state.

As shown in FIG. 7, the AP may operate in an immediate response manner in which a data frame is transmitted after a specific time (e.g., short inter-frame space (SIFS)) from reception of a PS-poll frame from the STA. Meanwhile, if the AP fails to prepare a data frame to be transmitted to the STA during the SIFS time after reception of the PS-poll frame, the AP may operate in a deferred response manner, which will be described with reference to FIG. 8.

In the example of FIG. 8, an operation in which the STA switches from the sleep state to the awake state to receive a TIM from the AP and transmit a PS-poll frame to the AP through contention is the same as the example of FIG. 7. If the AP fails to prepare the data frame during the SIFS even if the PS-poll frame is received, an ACK frame may be transmitted to the STA instead of transmitting a data frame. When the data frame is prepared after transmitting the ACK frame, the AP may transmit a data frame to the STA after performing contending. The STA may transmit the ACK frame to the AP to indicate that the data frame is successfully received, and then may switch to the sleep state.

FIG. 9 shows an example in which an AP transmits a DTIM. STAs may switch from a sleep state to an awake state to receive a beacon frame including a DTIM element from the AP. Through the received DTIM, the STAs may know that a multicast/broadcast frame will be transmitted. The AP may transmit data (i.e., multicast/broadcast frame) directly without an operation of transmitting/receiving a PS-poll frame after transmitting the beacon frame including the DTIM. The STAs may receive data while maintaining the awake state persistently after reception of the beacon frame including the DTIM, and may switch back to the sleep state after data reception is complete.

General Frame Structure

Figure 10:
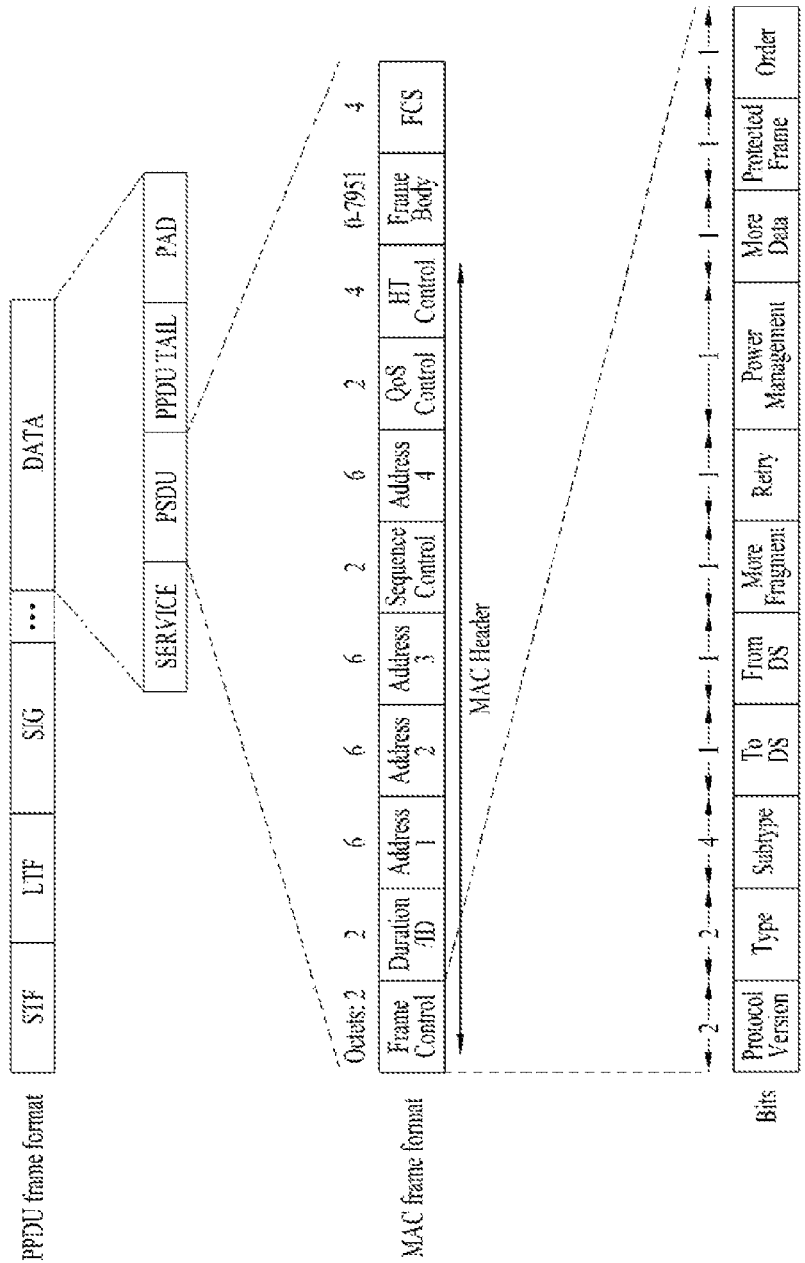
FIG. 10 is a drawing for explaining an example of a frame structure used in an IEEE 802.11 system.

FIG. 10 is a drawing for explaining an example of a frame structure used in an IEEE 802.11 system.

A physical layer protocol data unit (PPDU) frame format may include a short training field (STF), a long training field (LTF), a signal (SIG) field, and a data field. The most basic (e.g., non-high throughput (HT)) PPDU frame format may include only a legacy-STF (L-STF), a legacy-LTF (L-LTF), an SIG field, and a data field.

The STF is a signal for signal detection, automatic gain control (AGC), diversity selection, precise timing synchronization, or the like, and the LTF is a signal for channel estimation, frequency error estimation, or the like. The STF and the LTF may be collectively referred to as a PLCP preamble, and the PLCP preamble may be a signal for channel estimation and synchronization of an OFDM physical layer.

The SIG field may include a rate field and a length field or the like. The rate field may include information on a data modulation and coding rate. The length field may include information on a data length. In addition, the SIG field may include a parity bit, an SIG tail bit, or the like.

The data field may include a service field, a physical layer service data unit (PSDU), and a PPDU tail bit, and optionally may include a padding bit. Some bits of the service field may be used for synchronization of a descrambler at a receiving end. The PSDU may include data generated/used in a higher layer, in association with a MAC protocol data unit (MPDU) defined in a MAC layer. The PPDU tail bit may be used to return an encoder to a zero state. The padding bit may be used to adjust a length of the data field to a specific unit.

The MPDU is defined according to various MAC frame formats, and a basic MAC frame consists of a MAC header, a frame body, and a frame check sequence (FCS). The MAC frame may be constructed of an MPDU and may be transmitted/received through a PSDU of a data part of a PPDU frame format.

The MAC header includes a frame control field, a duration/ID field, an address field, or the like. The frame control field may include control information required for frame transmission/reception. The duration/ID field may be set to a time for transmitting a corresponding frame or the like.

The duration/ID field included in the MAC header may be set to a 16-bit length (e.g., B0~B15). Content included in the duration/ID field may vary depending on a frame type and a sub type, whether it is transmitted during a contention free period (CFP), QoS capability of a transmitting STA, or the like. In a control frame of which a sub type is PS-poll, the duration/ID field may include an AID of a transmitting STA (e.g., through 14 LSB bits), and 2 MSB bits may be set to 1. (ii) In frames transmitted during a CFP by a point coordinator (PC) or a non-QoS STA, the duration/ID field may be set to a fixed value (e.g., 32768). (iii) In addition thereto, in other frames transmitted by the non-QoS STA or control frames transmitted by the QoS STA, the duration/ID field may include a duration value defined for each frame type. In a data frame or management frame transmitted by the QoS STA, the duration/ID field may include a duration value defined for each frame type. For example, if the duration/ID field is set to B15=0, it indicates that the duration/ID field is used to indicate a TXOP duration, and B0~B14 may be used to indicate an actual TXOP duration. The actual TXOP duration indicated by the B0~B14 may be any one of 0~32767, and a unit thereof may be a microsecond (us). However, if the duration/ID field indicates a fixed TXOP duration value (e.g., 32768), it may be set to B15=1 and B0~B14=0. In addition thereto, if it is set to B14=1 and B15=1, the duration/ID field is used to indicate an AID, and B0~B13 indicate one AID in the range of 1~2007. Details of Sequence Control, QoS Control, and HT Control subfields of a MAC header may refer to the IEEE 802.11 standard document.

A frame control field of the MAC header may include Protocol Version, Type, Subtype, To DS, From DS, More Fragment, Retry, Power Management, More Data, Protected Frame, and Order subfields. Details of each subfield of the frame control field may refer to the IEEE 802.11 standard document.

Wake-Up Radio (WUR)

First, a wake-up radio receiver (WURx) compatible with a WLAN (e.g., 802.11) will be described in general with reference to FIG. 11.

Figure 11:
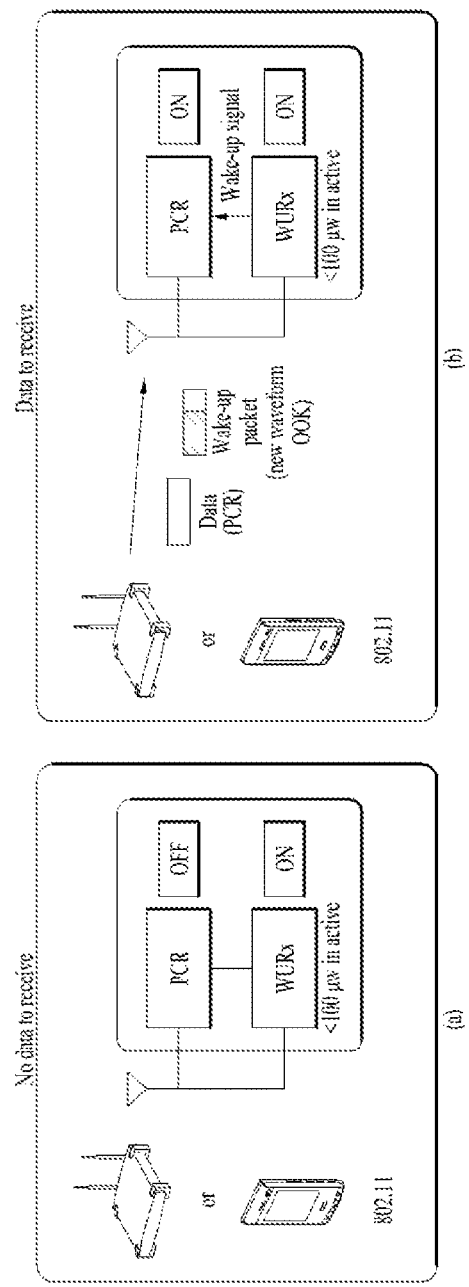
FIG. 11 illustrates a WUR receiver available for a WLAN system (e.g., 802.11).

Referring to FIG. 11, a STA may support a primary connectivity radio (PCR, e.g., IEEE 802.11a/b/g/n/ac/ax WLAN) for main wireless communication and a wake-up radio (WUR, e.g., IEEE 802.11ba).

The PCR may be used for data transmission and reception and may be turned off when there is no data to transmit or receive. When there is a packet to receive with the PCR turned off, a WURx of the STA may wake up the PCR. Accordingly, user data is transmitted and received through the PCR.

The WURx may not be used for user data but may function only to wake up a PCR transceiver. The WURx may be a simple receiver having no transmitter and is activated while the PCR is turned off. The desired power consumption of the WURx which is activated does preferably not exceed 100 microwatt (uW). For the WURx to operate with low power, a simple modulation scheme, for example, on-off keying (OOK), may be used, and a narrow bandwidth (e.g., 4 MHz or 5 MHz) may be used. The desired reception range (e.g., distance) of the WURx may currently correspond to that in 802.11.

Figure 12:
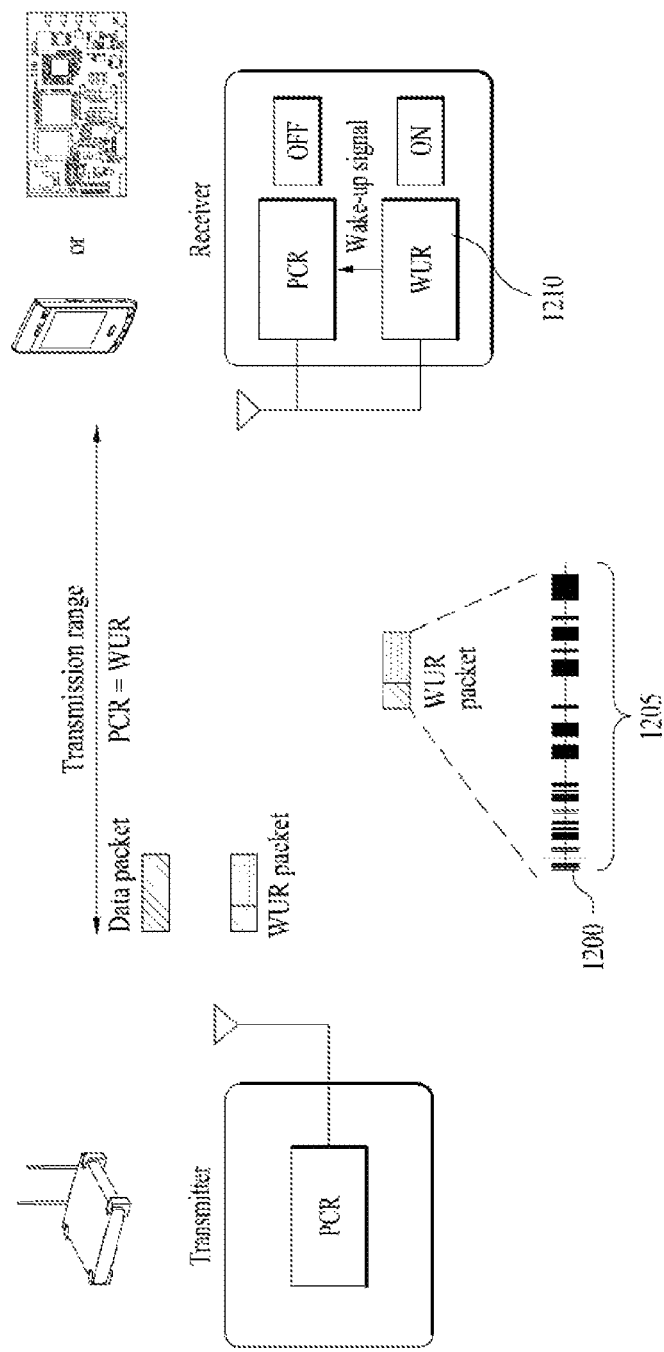
FIG. 12 illustrates the operation of a WUR receiver.

FIG. 12 illustrates the design and operation of a WUR packet.

Referring to FIG. 12, a WUR packet may include a PCR part (1200) and a WUR part (1205).

The PCR part (1200) is for coexistence with a legacy WLAN system and may also be referred to as a WLAN preamble. To protect the WUR packet from another PCR STA, at least one of an L-STF, an L-LTF, and an L-SIG for a legacy WLAN may be included in the PCR part (1200). Thus, a third-party legacy STA may identify through the PCR part (1200) of the WUR packet that the WUR packet is not intended for the third-party legacy STA and a PCR medium is occupied by another STA. Here, a WURx does not decode the PCR part of the WUR packet, because the WURx supporting narrowband and OOK demodulation does not support receiving a PCR signal.

At least part of the WUR part (1205) may be modulated by OOK. For example, the WUR part may include at least one of a WUR preamble, a MAC header (e.g., a receiver address), a frame body, and a frame check sequence (FCS). OOK modulation may also be performed by modifying an OFDM transmitter.

As described above, the WURx (1210) consumes a very small power of 100 uW or less and may be configured as a small and simple OOK demodulator.

Since the WUR packet needs designing to be compatible in a WLAN system, the WUR packet may include a legacy WLAN preamble (e.g., an OFDM scheme) and a new LP-WUR packet waveform (e.g., OOK modulation).

Figure 13:
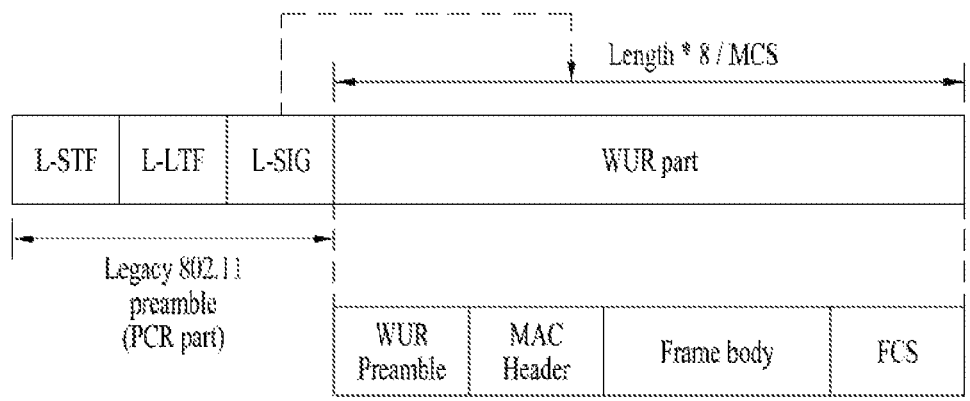
FIG. 13 illustrates an example of a WUR packet.

FIG. 13 illustrates an example of a WUR packet. The WUR packet illustrated in FIG. 13 includes a PCR part (e.g., a legacy WLAN preamble) for coexistence with a legacy STA.

Referring to FIG. 13, the legacy WLAN preamble may include an L-STF, an L-LTF, and an L-SIG. A WLAN STA (e.g., a third party) may detect the start of the WUR packet through the L-STF. Further, the WLAN STA (e.g., a third party) may identify the end of the WUR packet through the L-SIG. For example, the L-SIG field may indicate the length of a payload (e.g., OOK-modulated) of the WUR packet.

The WUR part may include at least one of a WUR preamble, a MAC header, a frame body, and an FCS. The WUR preamble may include, for example, a PN sequence. The MAC header may receive a receiver address. The frame body may include other information necessary for wake-up. The FCS may include a cyclic redundancy check (CRC).

Figure 14:
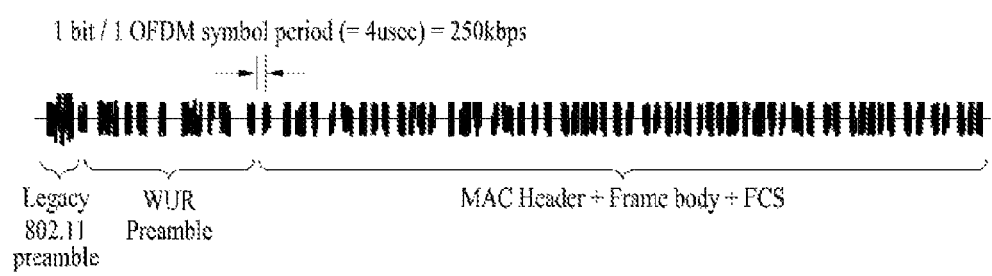
FIG. 14 illustrates the waveform of a WUR packet.

FIG. 14 illustrates the waveform of the WUR packet illustrated in FIG. 13. Referring to FIG. 14, the OOK-modulated WUR part may transmit one bit for the length of one OFDM symbol (e.g., 4 usec). Therefore, the data rate of the WUR part may be 250 Kbps.

Figure 15:
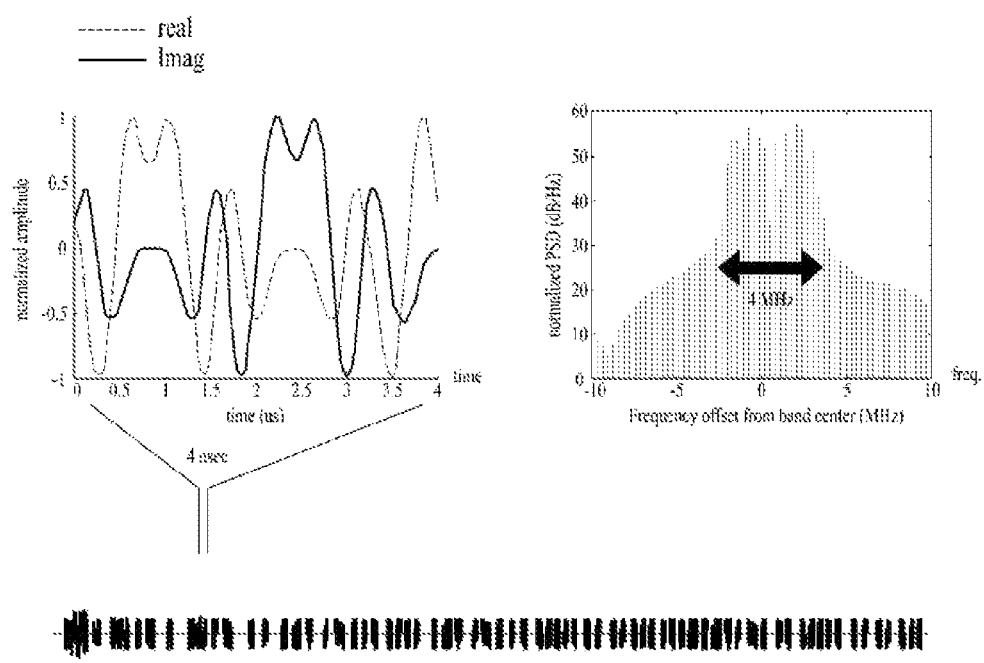
FIG. 15 illustrates a WUR packet generated using an OFDM transmitter of a WLAN.

FIG. 15 illustrates a WUR packet generated using an OFDM transmitter of a WLAN. A phase-shift keying (PSK)-OFDM transmission scheme is used in the WLAN, in which case generating a WUR packet by adding an OOK modulator for OOK modulation may cause an increase in costs for configuring a transmitter. Thus, a method of generating an OOK-modulated WUR packet reusing an OFDM transmitter is illustrated.

According to an OOK modulation scheme, a bit value of 1 is modulated into a symbol having a power of a threshold value or higher (i.e., an on-symbol), and a bit value of 0 is modulated into a symbol having a power of less than the threshold value (i.e., an off-symbol). On the contrary, it is also possible to define a bit value of 1 as power-off.

In the OOK modulation scheme, a bit value of 1/0 is indicated through power-on/off at the position of a symbol.

This simple OOK modulation/demodulation scheme can reduce power consumed for signal detection/demodulation of a receiver and can reduce costs for implementing signal detection/demodulation. Further, OOK modulation of turning on/off a signal may also be performed reusing an existing OFDM transmitter.

A left graph in FIG. 15 illustrates a real part and an imaginary part of the normalized amplitude of a bit value of 1, which is OOK-modulated reusing the existing OFDM transmitter of the WLAN, during a one-symbol interval (e.g., 4 usec). The result of OOK modulation of a bit value of 0 corresponds to power-off and thus is not shown.

A right graph of FIG. 15 illustrates the normalized power spectral density (PSD) of a bit value of 1, which is OOK-modulated reusing the existing OFDM transmitter of the WLAN, in a frequency domain. For example, central 4 MHz in a band may be used for a WUR. Although FIG. 15 shows that the WUR operates at a 4 MHz bandwidth, which is for convenience of description, a different frequency band may be used. Here, it is preferable that the WUR operates at a bandwidth smaller than the operating bandwidth of a PCR (e.g., an existing WLAN) in consideration of power saving.

In FIG. 15, it is assumed that subcarrier spacing is 312.5 kHz, and the bandwidth of an OOK pulse corresponds to 13 subcarriers. As mentioned above, 13 subcarriers correspond to about 4 MHz (i.e., 4.06 MHz=13*312.5 kHz).

Defining an input sequence of inverse fast Fourier transform (IFFT) as s={13 subcarrier tone sequence}, the existing OFDM transmitter performs IFFT on the sequence s by Xt=IFFT(s) and attaches a cyclic prefix (CP) with a 0.8 sec length to the sequence, thereby obtaining a symbol having a length of about 4 us.

A WUR packet may also be referred to as a WUR packet, a WUR frame, or a WUR PPDU. A WUR packet may be a packet for broadcast/multicast (e.g., a WUR beacon) or a packet for unicast (e.g., a packet to terminate a WUR mode of a particular WUR STA and to wake up the WUR STA).

Figure 16:
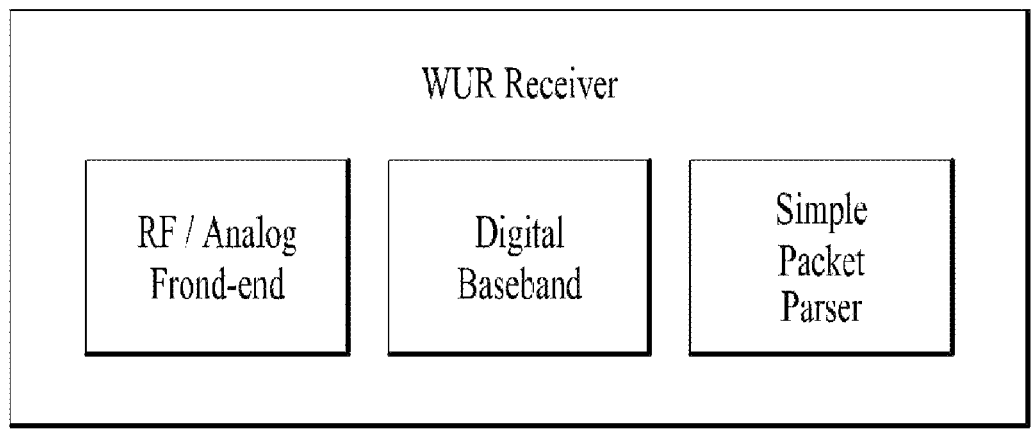
FIG. 16 illustrates the structure of a WUR receiver.

FIG. 16 illustrates the structure of a WUR receiver (WURx). Referring to FIG. 16, the WURs may include an RF/analog front end, a digital baseband processor, a simple packet parser. FIG. 16 shows an illustrative configuration, and a WURx according to the present disclosure is not limited to FIG. 16.

Hereinafter, a WLAN STA having the WUR receiver is simply referred to as a WUR STA. The WUR STA may also be simply referred to as an STA.

OOK Modulation With Manchester Coding

According to an embodiment of the present disclosure, Manchester coding may be used for OOK symbol generation. According to the Manchester coding, a 1-bit information is indicated through two sub-information (two coded bits). For example, when a 1-bit information '0' is processed with Manchester coding, two sub-information bits '10' (i.e., On-Off) are outputted. Conversely, when a 1-bit information '1' is processed with Manchester coding, two sub-information bits '01' (i.e., Off-On) are outputted. However, the On-Off order of the sub-information bits may be reversed.

A method for generating 1 OOK symbol will be described based on such Manchester coding scheme. For simplicity in the description, 1 OOK symbol is 3.2 us in the time domain and corresponds to K number of subcarriers in the frequency domain. However, the present disclosure will not be limited only to this.

Firstly, based on the Manchester coding, in the method for generating an OOK signal for a 1-bit information '0', 1 OOK symbol length may be divided into (i) 1.6 us for a first sub-information bit '1' and (ii) 1.6 us for a second sub-information bit '0'.

(i) A signal corresponding to the first sub-information bit '1' may be obtained by mapping, among the K number of subcarriers, odd-number indexed subcarriers to β and mapping even-number indexed subcarriers to 0, and then performing IFFT. For example, in case β is mapped at an interval of 2 subcarriers in the frequency domain and then IFFT is performed, a periodic signal of 1.6 us is indicated in the time domain by being repeated 2 times. Among the periodic signal of 1.6 us being repeated 2 times, the first or second signal may be used as the signal corresponding to the first sub-information bit '1'. As a power normalization factor, β may, for example, be 1/sqrt(ceil(K/2)). For example, among the total of 64 subcarriers (i.e., 20 MHz band), consecutive K number of subcarriers being used for the generation of the signal corresponding to the first sub-information bit '1' may, for example, be expressed as [33−floor(K/2): 33+ceil(K/2)−1].

(ii) A signal corresponding to the second sub-information bit '0' may be obtained by mapping K number of subcarriers to 0 and then performing IFFT. For example, among the total of 64 subcarriers (i.e., 20 MHz band), consecutive K number of subcarriers being used for the generation of the signal corresponding to the second sub-information bit '0' may, for example, be expressed as [33−floor(K/2): 33+ceil(K/2)−1].

The OOK symbol for the 1-bit information '1' may be obtained by arranging the signal corresponding to the sub-information bit '1' after the signal corresponding to the sub-information bit '0'.

Symbol Reduction

For example, a 1 symbol length for WUR may be configured to be less than 3.2 us. For example, 1 symbol may be configured as information of 1.6 us, 0.8 us or 0.4 us+CP.

(i) 0.8 us, information bit 1: Among K number of consecutive subcarriers, β(e.g., power normalization factor)*1 may be mapped to the subcarriers (i.e., 1, 5, 9, . . . ) satisfying mod(subcarrier index,4)=1, and the remaining subcarriers may be nulled (e.g., the subcarriers may be mapped to 0). β may be 1/sqrt(ceil(K/4)). As described above, β*1 may be mapped at an interval of 4 subcarriers. If IFFT is performed by mapping β*1 at an interval of 4 subcarriers within the frequency domain, signals having the length of 0.8 us are repeated in the time domain, and, among such signals, one signal may be used as a signal corresponding to information bit 1.

(ii) 0.8 us, information bit 0: By mapping 0 to K number of subcarriers, and, then, by performing IFFT, time domain signals may be obtained, and, among these signals, one signal having the length of 0.8 us may be used.

(iii) 0.4 us, information bit 1: Among K number of consecutive subcarriers, β(e.g., power normalization factor)*1 may be mapped to the subcarriers (i.e., 1, 9, 17, . . . ) satisfying mod(subcarrier index,8)=1, and the remaining subcarriers may be nulled (e.g., the subcarriers may be mapped to 0). β may be 1/sqrt(ceil(K/8)). As described above, β*1 may be mapped at an interval of 8 subcarriers. If IFFT is performed by mapping β*1 at an interval of 8 subcarriers within the frequency domain, signals having the length of 0.4 us are repeated in the time domain, and, among such signals, one signal may be used as a signal corresponding to information bit 1.

(iv) 0.4 us, information bit 0: By mapping 0 to K number of subcarriers, and, then, by performing IFFT, time domain signals may be obtained, and, among these signals, one signal having the length of 0.4 us may be used.

WUR Preamble Construction Based on Data Rate

A payload of a WUR PPDU for waking up PCR may be transmitted through one of various data rates.

A 1-symbol length may vary depending upon the data rate. According to an embodiment of the present disclosure, by configuring a WUR preamble differently, a data rate that is used in the WUR PPDU may be indicated through the WUR preamble. For example, proposed herein are a method for configuring a WUR preamble through a symbol length corresponding to a low data rate and a method for configuring a WUR preamble through a high data rate.

Figure 17:
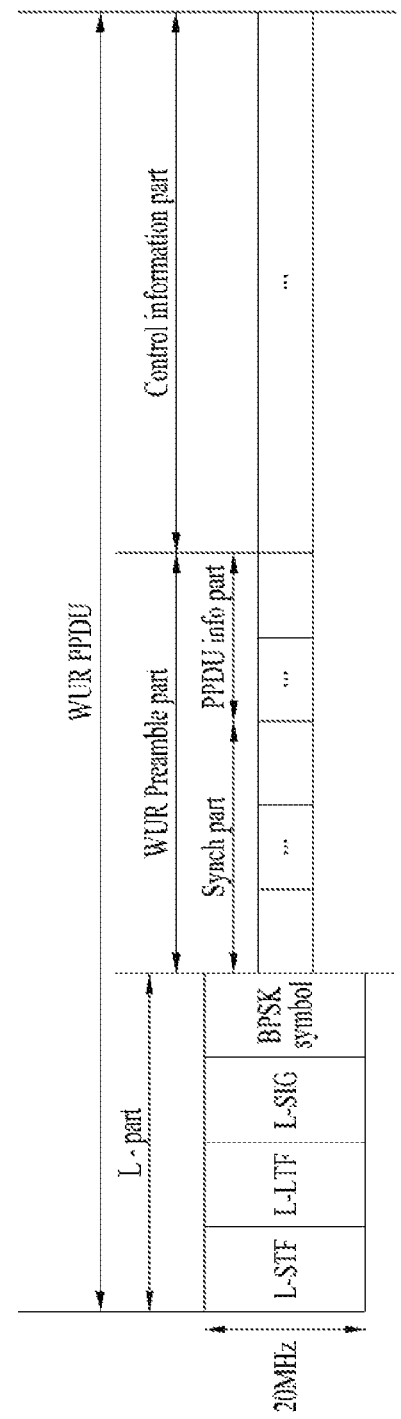
FIG. 17 illustrates a WUR PPDU format according to an embodiment of the present disclosure.

FIG. 17 illustrates a WUR PPDU format according to an embodiment of the present disclosure.

Referring to FIG. 17, in order to prevent the existing (or old) PCR STAs from falsely detecting the WUR PPDU as their own PPDU, a 1 BPSK symbol is added after a legacy preamble of the WUR PPDU, and a WUR part starts after a dummy symbol. The WUR preamble may include a part for auto-gain control (AGC)/synchronization and a part for WUR PPDU information/detection.

Information on the WUR PPDU and information for WUR signal detection may be transmitted through a SIG field just as a frame format of the existing WLAN or may be indicated through a signature sequence.

A data rate of the WUR payload may be 62.5 kbps or 250 kbps. Additionally, apart from the two data rates, other data rates, e.g., a data rate that is higher than 250 kbps may also be considered. In the embodiments of the present disclosure, since two data rates (i.e., 62.5 kbps and 250 kbps) are assumed for the payload, a low data rate may refer to 62.5 kbps, and a high data rate may refer to 250 kbps. However, the present disclosure will not be limited only to two data rates (i.e., 62.5 kbps and 250 kbps), and, therefore, other data rates may also be applied herein.

Since the low data rate being applied to the WUR payload is 62.5 kbps (i.e., 1 symbol duration=16 us), for a highly reliable WUR preamble transmission, a symbol supporting the 62.5 kbps data rate may be used in the WUR preamble or a data rate that is lower than the 62.5 kbps data rate may be applied. Therefore, the WUR preamble may be configured of symbols (e.g., 16 us lengths) for supporting the 62.5 kbps data rate. Additionally, in case a data rate that is lower than the 62.5 kbps data rate is used, the WUR preamble may be configured of symbols each having a length of 16 us*n.

Figure 18:
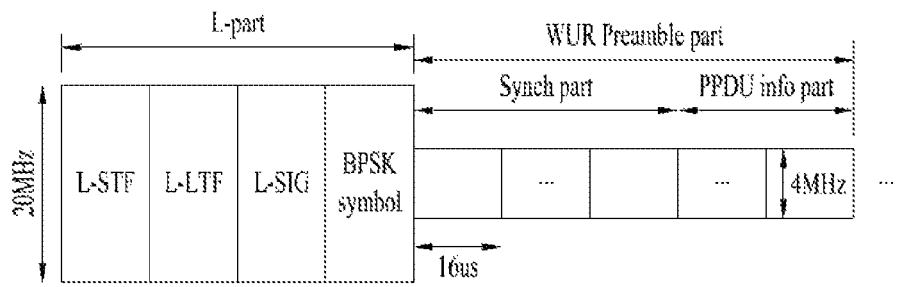
FIG. 18 illustrates an example of a WUR preamble structure according to an embodiment of the present disclosure.
Figure 18:
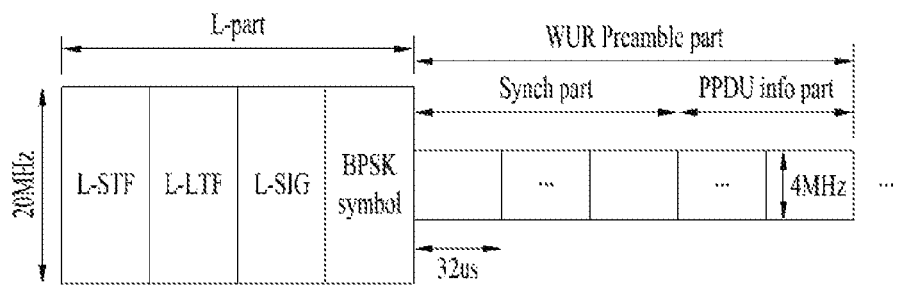
Figure 18:
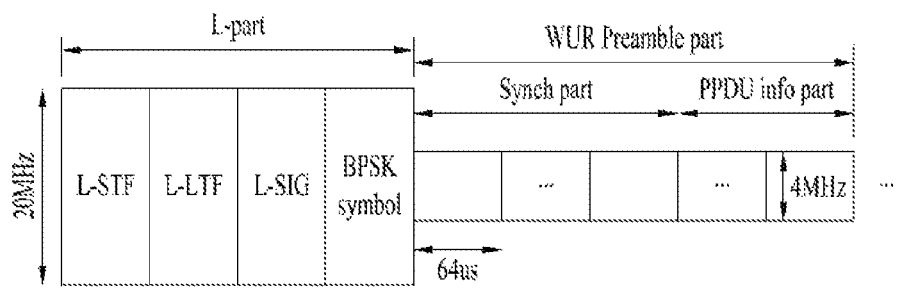

FIG. 18 illustrates an example of a WUR preamble structure according to a data rate.

FIG. 18(a) shows a case where a data rate of 62.5 kbps is used in the WUR preamble, FIG. 18(b) shows a case where a data rate of 31.25 kbps is used in the WUR preamble, FIG. 18(c) shows a case where a data rate of 15.625 kbps is used in the WUR preamble.

Meanwhile, the data rate of the WUR preamble that is mentioned in FIG. 18 and the data rate used in the WUR payload may be independent. For example, although the data rate of the WUR preamble is 62.5 kbps/31.25 kbps/15.625 kbps, the data rate of the WUR payload may be 250 kbps or 62.5 kbps.

As described above, in case of configuring a preamble by using a low data rate of the payload, or in case of configuring a preamble by using a data rate that is lower than the low data rate of the payload, the length of 1 symbol in the WUR preamble becomes longer. Accordingly, in a case where a synchronization sequence having a long length is used in the WUR preamble, or in case a signature sequence having a long length is used for transmitting PPDU related information, it will be disadvantageous in that the overhead is increased. For example, if the length of a synchronization sequence corresponds to 64 bits, and if 1 symbol is consumed for a 1-bit transmission, and if the data rate being applied to the WUR preamble is 31.25 kbps, since 2048 (=64*32) us is needed for the synchronization sequence transmission, a relatively larger overhead is generated.

Therefore, as a method for reducing overhead of the preamble, the preamble may be configured as described below in Examples 1 to 4.

Example 1

For example, a total length of the WUR preamble may be configured based on a 1-symbol length of the case where a low data rate is applied to the payload of the WUR PPDU. Since the 1-symbol length for data rate 62.5 kbps is equal to 16 us, the length of the WUR preamble may be configured as 16 us*m. Herein, m may have various integer values, such as 1, 2, 3, . . . , and so on.

As another example, a total length of the WUR preamble may be configured based on a 1-symbol length of the case where a high data rate is applied to the payload of the WUR PPDU. Since the 1-symbol length for data rate 250 kbp is equal to 4 us, the length of the WUR preamble may be configured as 4 us*m. Herein, m may have various integer values, such as 1, 2, 3, . . . , and so on.

The m value may be determined based on the length of the synchronization sequence and a number of bits of the WUR PPDU information being signaled through the WUR preamble. For example, it will be assumed that a 32-bit sequence is used as the synchronization sequence. Additionally, a SIG-field and/or a signature sequence may be used for signaling the WUR PPDU information through the WUR preamble.

When a low data rate (e.g., 62.5 kbps) is assumed, in order to satisfy the performance requirement (e.g., 1% PER) for the WUR PPDU information indication, lengths needed for the SIG-field/signature sequence are as shown below in Table 1 and Table 2.

Table 1 shows a case where the WUR PPDU information indication is a 1-bit indication.

TABLE 1

| Signaling method | Total length |
| --- | --- |
| SIG-field(without CRC) | 32 us |
| Signature sequence (length = 3) | 46 us |

In Table 1, in case a SIG-field is used for the 1-bit WUR PPDU information indication, since the 1% PER performance cannot be satisfied by the data rate of 62.5 kbps, a lower data rate of 31.25 kbps is applied to the WUR preamble. As a result, 32 us is needed for the 1-bit SIG-field.

Meanwhile, in case a signature sequence is used for the 1-bit WUR PPDU information indication, a total of 2 signature sequences may exist. Each of the 2 signature sequences may respectively correspond to a bit value of 0 and a bit value of 1. When the data rate of 62.5 kbps is assumed, in order to reduce the occurrence of error in differentiation between the 2 signature sequences to less than 1% PER, a signature sequence length of 3 is needed.

Table 1 shows a case where the WUR PPDU information indication is a 2-bit indication.

TABLE 2

| Signaling method | Total length |
| --- | --- |
| SIG-field(without CRC) | 128 us |
| Signature sequence (length = 8) | 16 us * 8 = 128 us |
| Signature sequence (length = 9) | 16 us * 9 = 144 us |

Just as in Table 1, in case a SIG field is used, since a data rate of 31.25 kbps is used, the length of 1 symbol is equal to 64 us.

In case a preamble is configured based on a symbol length (e.g., 16 us) of a low data rate (e.g., 62.5 kbps), the total length of a preamble may be determined as a sum of the synchronization sequence length (e.g., 16 us*32)+the signaling length of the WUR PPDU information.

Meanwhile, in case a synchronization sequence and a signature sequence are used, it may be advantageous for the performance enhancement to use the sequence having the larger number of bits or to use the sequence having the greater Hamming distance.

Therefore, in order to use the sequence having the larger number of bits during the same WUR preamble duration, a WUR transmitter may configure a symbol in 250 kbps units and may configure/transmit a sequence corresponding to the total number of bits. However, the 250 kbps unit symbol configuration is merely an example. And, therefore, a sequence (e.g., synchronization sequence/PPDU information indication) being carried in a preamble may be transmitted by using a symbol structure for another high data rate (e.g., 500 kbps, 1 Mbps, and so on) of the WUR PPDU.

As described above, if the total duration of the WUR preamble is determined based on a low data rate, and if the length of 1 symbol configuring the WUR preamble is determined based on a high data rate, a sequence having the larger number of bits may be used in the WUR preamble. And, thus, the performance may be enhanced.

Example 2

Figure 19:
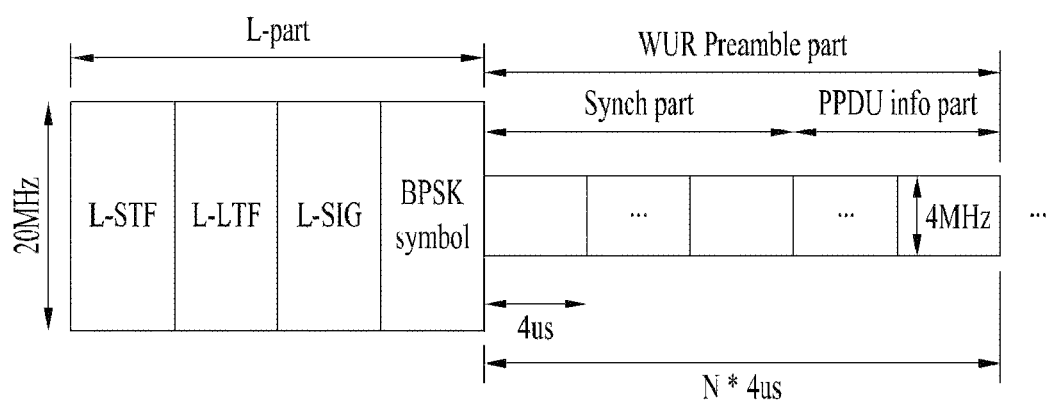
FIG. 19 illustrates a WUR preamble structure according to another embodiment of the present disclosure.

FIG. 19 illustrates a WUR preamble structure according to Example 2.

Unlike Example 1, in order to reduce overhead of the preamble, the length of 1 symbol in the preamble may be configured as a symbol length corresponding to a high data rate. At this point, the number of bits in a sequence being used for synchronization and indication of the preamble may be equal to the number of bits in a sequence being used in the low data rate.

For example, it will be assumed that the synchronization sequence in the low data rate is a 32-bit sequence, and that the sequence being used for the PPDU information indication is a 3-bit sequence, and that each symbol of the WUR preamble follows a symbol structure of a high data rate.

In case the high data rate is 250 kbps, one symbol of the preamble is configured in 4 us units. Therefore, the total length of the preamble is 32*4 us+3*4 us=140 us. Since 560 us(=32*16 us+3*16 us) are consumed when configuring the WUR preamble in symbol units of a low data rate, of the WUR preamble is configured on symbol units of a high data rate, the overhead may be reduced by approximately 4 times.

Meanwhile, apart from 250 kbps (i.e., 4 us), 500 kbps (i.e., 2 us), 1 Mbps (i.e., 1 us), and so on, may also be considered as the high data rate.

Example 3

Figure 20:
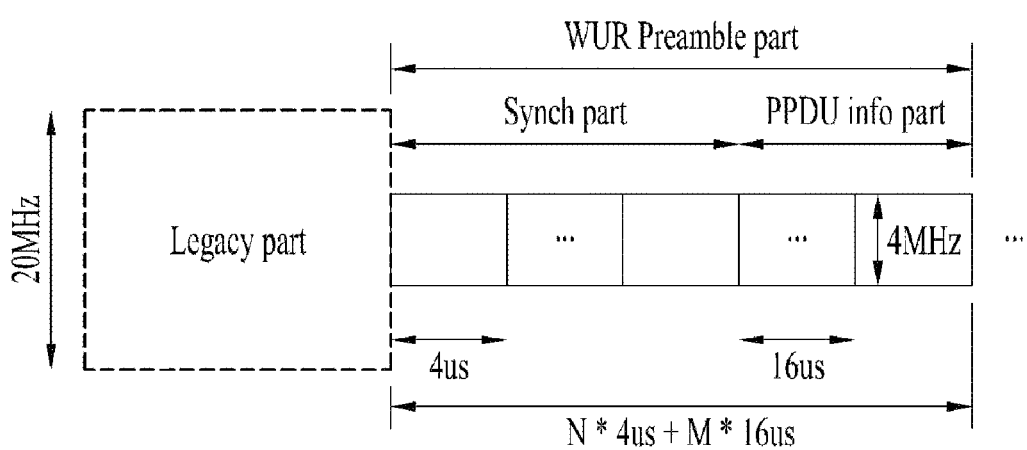
FIG. 20 illustrates a WUR preamble structure according to another embodiment of the present disclosure.

FIG. 20 illustrates a WUR preamble structure according to Example 3.

Unlike Example 1 and Example 2, wherein each of the symbols within the preamble is configured of the same symbol unit, according to Example 3, a different symbol unit may be used for each part configuring the preamble.

A synchronization part and a PPDU information indication part configuring the preamble may each be configured of the following combination of data rates, as described below.

For example, when it is assumed that the low data rate is 62.5 kbps and that the high data rate is 250 kbps, a 4 us symbol structure applying the high data rate may be used for the synchronization part, which requires a relatively longer length, and a 16 us symbol structure applying the low data rate may be used for the information indication part, for which reliability is important.

Meanwhile, apart from 250 kbps (i.e., 4 us), 500 kbps (i.e., 2 us), 1 Mbps (i.e., 1 us), and so on, may also be considered as the high data rate.

Example 4

As opposed to Example 3, according to Example 4, considering the reliability of the synchronization sequence, a low data rate (e.g., 62.5 kbps, 16 us-length symbol) may be applied to the synchronization part, and a high data rate (e.g., 500 kbps and 2 us-length symbol or 1 Mbps and 1 us-length symbol) may be applied to the information indication part in order to minimize the overhead.

In case of using the high data rate, in order to prevent performance degradation, a sequence having a larger number of bits, as compared to the case where the low data rate is used, may be used.

Figure 21:
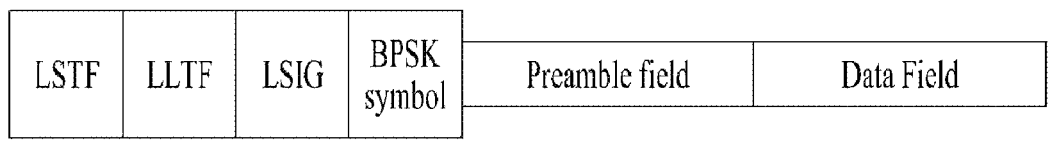
FIG. 21 illustrates a WUR PPDU format according to another embodiment of the present disclosure.

FIG. 21 illustrates a WUR PPDU format according to another embodiment of the present disclosure.

Referring to FIG. 21, for coexistence of the legacy PCR and WUR, in the WUR PPDU, an L-Part is positioned before a WUR part, and the WUR part may be configured of a WUR-preamble and a WUR-body. The WUR-body includes control information that is not data for a WUR STA. the L-Part is transmitted for a 3rd party STA and not for a WUR receiver, and the WUR receiver may not decode the L-Part. The WUR part may be transmitted through a narrow bandwidth (e.g., 4 MHz BW) by using part (or some) of the available tones within a BW through which the L-Part is transmitted. The number of available tones of the WUR part is equal to 13, in case, for example, an OFDM numerology of 11a is used, and the length of a frequency sequence for configuring a WUR ON symbol is equal to the number of each available tone.

Since the WUR receiver receives a signal through a narrow bandwidth, the WUR receiver cannot decode the L-Part of the WUR PPDU. The WUR receiver may perform operations, such as synchronization/WUR packet detection, by using a WUR preamble field.

Hereinafter, a WUR preamble for the synchronization of WUR PPDU, WUR PPDU detection, and data rate indication of a WUR payload will be proposed.

Example 5

According to Example 5, a sequence length configuring the preamble is equal for all data rates. However, different sequences may be used according to the data rate. For example, a preamble sequence may be configured of a sequence having the length of 64, 128, 256 (e.g., Pseudo-Noise sequence, Golay sequence, Maximum Length sequence, orthogonal sequence or Hadamard sequence).

Each symbol of the preamble is transmitted through OOK modulation, and the length of 1 symbol may be equal to 1/2/4 us.

The WUR preamble may be configured as shown below in Table 3 according to the length and symbol duration of a preamble sequence.

TABLE 3

|   | Length | Symbol Duration |
|---|--------|-----------------|
| 1 | 64     | 4 us            |
| 2 | 64     | 2 us            |
| 3 | 64     | 1 us            |
| 4 | 128    | 2 us            |
| 5 | 128    | 1 us            |
| 6 | 256    | 1 us            |
| 7 | 256    | 2 us            |

A different sequence is mapped for each data rate, and a WUR transmitter may configure a preamble with the sequence being determined according to the data rate and may transmit the WUR PPDU.

The WUR receiver may perform timing synchronization through a correlation between a known sequence and the received sequence, and, at the same time, the WUR receiver may determine the data rate of the WUR payload through a selected sequence, which is selected during synchronization estimation. The sequence that is selected during the synchronization estimation may be a sequence indicating a maximum value of a correlation result.

For example, in case the number of data rates is equal to 2/4, the number of WUR preamble sequences for configuring the WUR preamble may also be equal to 2/4.

For error correction, the WUR preamble sequences may have a constant Hamming distance between one another.

A symbol duration corresponding to the data rate may be used in the preamble.

Example 6

According to Example 6, WUR preamble sequences having different lengths may be used for each data rate being applied to the WUR payload.

In general, a case where a high data rate is applied relates to an environment having an excellent channel situation as compared to a case where a low data rate is applied. Therefore, in the case where a high data rate is applied, a sequence having a short length (e.g., a sequence having a smaller number of bits) may be used in the WUR preamble. And, conversely, in the case where a low data rate is applied, a sequence having a long length (e.g., a sequence having a larger number of bits) may be used in the WUR preamble.

(1) A Method for Configuring the WUR Preamble to Have the Same Length for All Data Rates In order to use a long-length sequence (e.g., a sequence having a large(r) number of bits) in the case where a low data rate is used, a symbol of a short duration, e.g., a symbol configured of 1 us/2 us, may be configured within the same preamble length.

Conversely, in case of a high data rate, since the channel situation is excellent, the preamble may be configured by using a symbol having a duration of 2/4 us. And, herein, a sequence having a relatively shorter length (e.g., a sequence having a smaller number of bits) as compared to the low data rate may be used.

(2) A Method for Configuring the WUR Preamble to Have Different Lengths According to the Data Rate For example, the same symbol duration (e.g., 1/2/4 us) may be used in the WUR preamble for all data rates. However, by differently configuring the sequence length depending upon the data rate, the length of the preamble may vary based on the data rate.

For example, when 2 data rates are available for usage, a sequence having the length of 32/64/128 bits may be used for the high data rate (e.g., 250 kbps). In case of the low data rate (e.g., 62.5 kbps), a sequence having a relatively longer length, e.g., a sequence having the length of 64/128/256 bits, may be used.

Meanwhile, in order to reduce the overhead, the preamble may be configured based on the data rate applied to the payload. For example, in case the data rate is 500 kbps, the preamble may be configured by using a 2 us symbol duration.

Alternatively, when a long sequence for a low data rate and a short sequence for a high data rate exist, the short sequence may be generated/configured based on part of the long sequence. For example, the WUR transmitter and/or the WUR receiver may first configure a long sequence for the low data rate and may, then, configure the short sequence for the high data rate by using a part of the long sequence.

For example, in a case where it is assumed that 2 data rates are available for usage, if the length of a sequence for the low data rate is equal to 128/256, a short sequence for the high data rate may be configured by using a left half or a right half of the long sequence for the low data rate. For example, as the length of the short sequence is equal to a value N, which is obtained by dividing the length of the long sequence by the number of data rates, the short sequence may be generated from N MSBs/N LSBs/center N bits of the long sequence for the low data rate.

As described above, the length of a sequence may be differently configured depending upon the data rate.

Alternatively, a symbol duration may also be differently configured depending upon the data rate.

Example 7

According to Example 7, the preamble is configured based on two preamble sequences, and different frame formats may be used depending upon the data rate.

In case a sequence is allocated for each data rate, and in case the preamble is configured through the allocated sequence(s), the number of sequences increases in proportion to the number of data rates. Accordingly, the number of sessions of blind detection that are to be performed, by the WUR receiver, for WUR PPDU detection increases. And, as a result, power consumption is also increased.

Therefore, in order to prevent such problems, the preamble and preamble format may be configured as described below.

Two preamble sequences exist, wherein one sequence is used for a lowest data rate, and the other sequence is used for all of the remaining data rates excluding the lowest data rate.

For example, in case 3 data rates of 62.5 kbps, 250 kbps, and 500 kbps are available for usage, Sequence 1 may be used for indicating the lowest data rate 62.5 kbps, and Sequence 2 may be used for indicating the remaining 2 data rates of 250 kbps and 500 kbps. Among the remaining 2 data rates, in order to indicate the data rate that is used in the WUR PPDU, a signaling part may be positioned after the preamble including Sequence 2. The signaling part may be a SIG field or a signature sequence.

Figure 22:
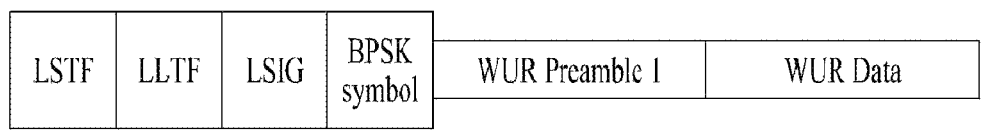
FIG. 22 illustrates a WUR preamble structure according to another embodiment of the present disclosure.
Figure 22:
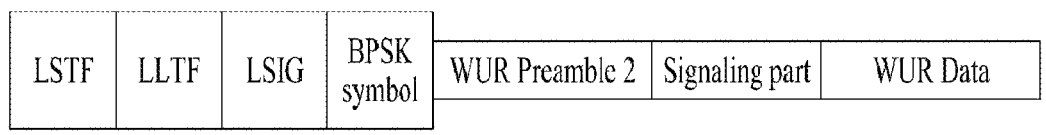

FIG. 22 illustrates a WUR preamble structure according to Example 7.

(a) of FIG. 22 is a case where the lowest data rate is applied, and, herein, a frame format is configured in a WUR preamble+WUR payload format.

(b) of FIG. 22 is a case where data rates other than the lowest data rate are applied, and, herein, a frame format is configured in a WUR preamble+signaling part for indicating the data rate (e.g., signature sequence or SIG-field)+WUR payload format.

Meanwhile, the sequence length may be 64/128/256, and the symbol duration may be 1/2/4 us.

As described above, two frame formats exist. Frame Format 1 is used for indicating the lowest data rate, and Frame Format 2 is used for indicating the other data rates, i.e., the high(er) data rates.

Preamble Sequence 1 is used for synchronization and data rate indication for a WUR PPDU when applying the lowest data rate.

Preamble Sequence 2 is used for indicating the high(er) data rates, and, at this point, Preamble Sequence 2 may also be configured of a sequence set of two or more sequences for indicating two or more data rates. For example, a different sequence may also be allocated for each high data rate. For example, if the high(er) data rates are 250 kbps and 500 kbps, Preamble Sequence 2 may be configured of Sub-sequence 1 for 250 kbps and Sub-sequence 2 for 500 kbps. And, herein, Sub-sequence 1 and Sub-sequence 2 may both have the same length.

In case a different frame format is used for each data rate, the lengths of each preamble sequence per format frame may be equal or different. If the lengths of each preamble sequence per format frame are different, a sequence having a long(er) length may be used for the low(er) data rate, and a sequence having a short(er) length may be used for the high(er) data rate.

The WUR receiver may perform timing synchronization for the WUR PPDU by using the preamble. And, the WUR receiver may determine the information on the data rate that is applied to the payload through a preamble sequence, which is detected at this point.

The aforementioned preamble sequence and sequence for configuring the preamble may be referred to as a WUR synchronization sequence, or the term may also be modified to a different field/sequence configuring the WUR frame.

Figure 23:
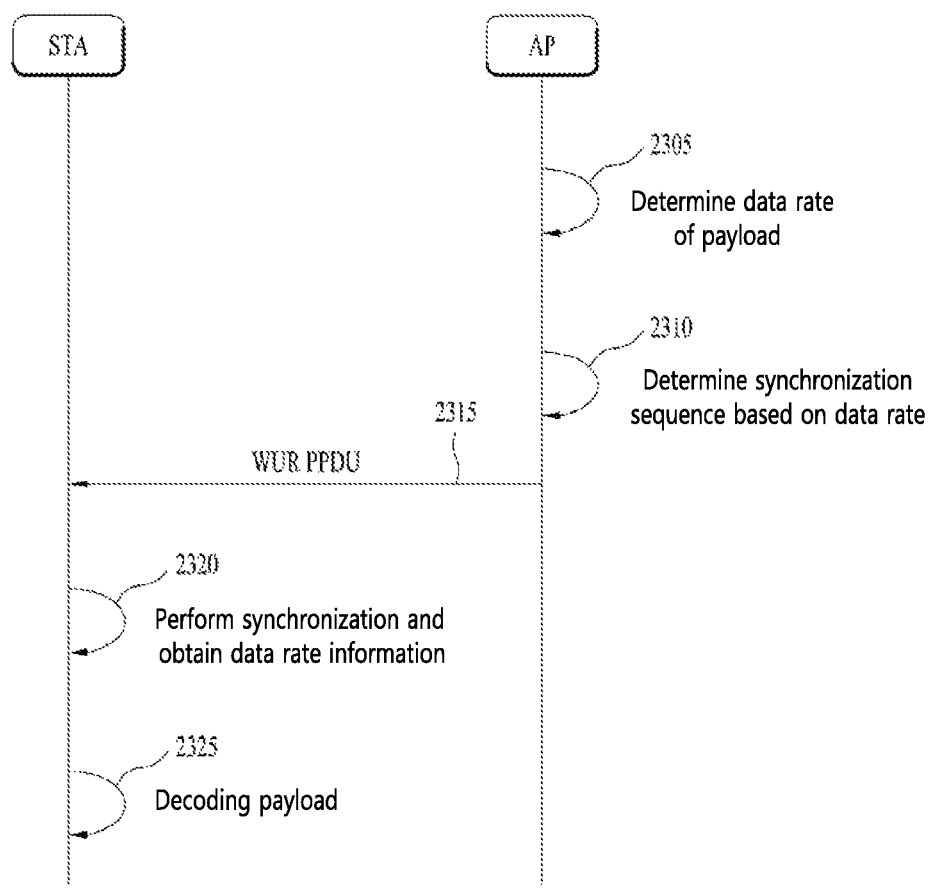
FIG. 23 illustrates a flow chart of a method for transmitting and/or receiving a WUR PPDU according to an embodiment of the present disclosure.

FIG. 23 illustrates a flow chart of a method for transmitting and/or receiving a WUR PPDU according to an embodiment of the present disclosure.

Referring to FIG. 23, an access point (AP) determines a data rate that is intended to be applied to a payload of a WUR PPDU (2305). The AP may differently configure a length of 1 symbol within the payload based on whether the data rate being applied to the payload is 250 kbps or 62.5 kbps.

The AP configures a synchronization sequence of a WUR preamble based on the determined data rate (2310). In case the data rate being applied to the payload is 250 kbps, the AP may configure a first sequence having a 32-bit length as the synchronization sequence, and, in case the data rate being applied to the payload is 62.5 kbps, the AP may configure a second sequence having a 64-bit length as the synchronization sequence.

The AP may configure the length of 1 symbol in the WUR preamble as 2 us regardless of whether the data rate being applied to the payload is 250 kbps or 62.5 kbps.

In case the data rate being applied to the payload is 250 kbps, the length of the WUR preamble may be equal to 64 us, and, in case the data rate being applied to the payload is 62.5 kbps, the length of the WUR preamble may be equal to 128 us.

The first sequence having the 32-bit length may be a sequence that can be obtained by using part of the second sequence having the 64-bit length. A part of the second sequence may be a left half of the second sequence or a right half of the second sequence.

An STA receives a WUR PPDU including a WUR preamble and a payload (2315).

The STA performs synchronization based on a synchronization sequence of the WUR preamble and obtains information on the data rate being applied to the payload (2320). In case the synchronization sequence is a first sequence having a 32-bit length the STA may determine the data rate being applied to the payload as 250 kbps, and, in case the synchronization sequence is a second sequence having a 64-bit length, the STA may determine the data rate being applied to the payload as 62.5 kbps. The STA may assume the length of 1 symbol in the WUR preamble as 2 us regardless of whether the data rate being applied to the payload is 250 kbps or 62.5 kbps.

The STA decodes the payload based on the information on the data rate (2325). The STA may differently assume the length of 1 symbol in the payload based on whether the data rate being applied to the payload is 250 kbps or 62.5 kbps and may decode the payload.

Figure 24:
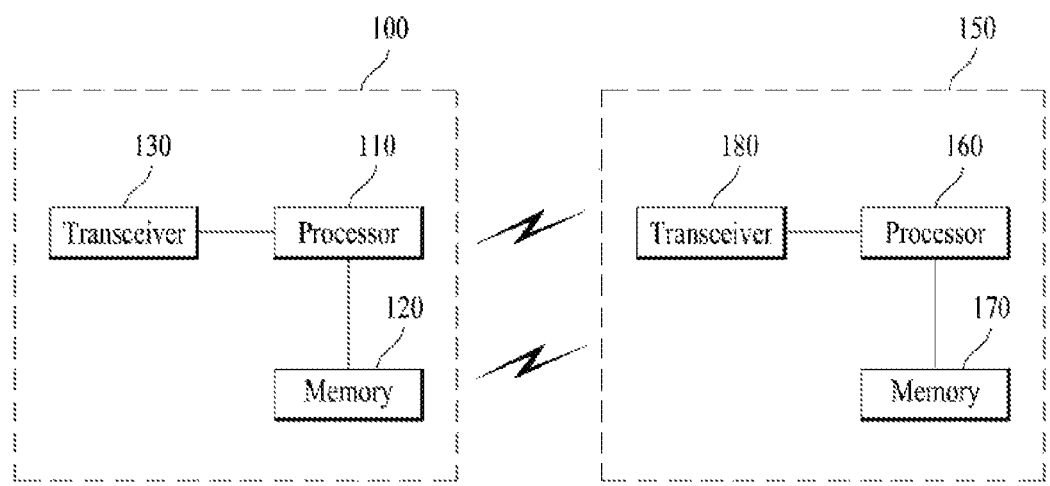
FIG. 24 illustrates a device according to one embodiment of the present disclosure.

FIG. 24 is a diagram describing a device for implementing the above-described method.

A wireless device (100) of FIG. 24 may correspond to a specific STA of the description presented above, and a wireless device (850) may correspond to the AP of the description presented above.

The STA (100) may include a processor (110), a memory (120), a transceiver (130), and the AP (150) may include a processor (160), a memory (170), a transceiver (180). The transceiver (130 and 180) may transmit/receive radio signals and may be executed in a physical layer of IEEE 802.11/ 3GPP, and so on. The processor (110 and 160) may be executed in a physical layer and/or a MAC layer and is/are operatively connected to the transceiver (130 and 180).

The processor (110 and 160) and/or the transceiver (130 and 180) may include an application-specific integrated circuit (ASIC), another chipset, a logical circuit and/or a data processor. The memory (120 and 170) may include a read-only memory (ROM), a random access memory (RAM), a flash memory, a memory card, a storage medium and/or another storage unit. When the embodiments are executed by software, the above-described method may be executed with modules (e.g., processes, functions, and so on) that perform the functions described herein. The modules may be stored in the memory (120, 170) and executed by the processor (110, 160). The memory (120, 170) may be positioned inside or outside of the processor (110, 160) and may be operatively connected to the processor (110, 160) by using various means well-known in the art.

The transceiver (130) of the STA may include a transmitter (not shown) and a receiver (not shown). The receiver of the STA may include a Primary Connectivity Radio receiver for receiving Primary Connectivity Radio (e.g., wireless LAN, such as IEEE 802.11 a/b/g/n/ac/ax, and so on) signals and a WUR receiver for receiving WUR signals. The transmitter of STA may include a Primary Connectivity Radio transmitter for transmitting Primary Connectivity Radio signals.

The transceiver (180) of the AP may include a transmitter (not shown) and a receiver (not shown). The transmitter of the AP may correspond to an OFDM transmitter. The AP may re-use the OFDM transmitter so as to transmit a WUR payload by using an OOK scheme. For example, as described above, the AP may perform OOK modulation on a WUR payload through the OFDM transmitter.

As described above, the detailed description of the preferred exemplary embodiment of the present disclosure is provided so that anyone skilled in the art can implement and execute the present disclosure. In the detailed description presented herein, although the present disclosure is described with reference to the preferred exemplary embodiment of the present disclosure, it will be understood by anyone having ordinary skills in the art that diverse modifications, alterations, and variations can be made in the present disclosure. Therefore, the scope and spirit of the present disclosure will not be limited only to the exemplary embodiments of the present disclosure set forth herein. Thus, it is intended to provide the broadest scope and spirit of the appended claims of the present disclosure that are equivalent to the disclosed principles and novel characteristics of the present disclosure.

INDUSTRIAL APPLICABILITY

The present disclosure is applicable to various wireless communication systems, including IEEE 802.11

What is claimed is:

1. A method for receiving a wake-up radio (WUR) physical layer protocol data unit (PPDU), by a station (STA), in a wireless LAN (WLAN), the method comprising:
receiving the WUR PPDU including a legacy part, a WUR preamble and a payload;
obtaining information on a data rate of the payload based on a synchronization sequence of the WUR preamble, wherein the data rate of the payload is determined as one of low data rate or high data rate; and
decoding the payload based on the information on the data rate,
wherein the legacy part is not decoded by the STA,
wherein a same one symbol duration is used in the WUR preamble for the low data rate and the high data rate,
wherein in case the synchronization sequence is a first sequence having a 32-bit length, the data rate of the payload is determined as the high data rate of 250 kbps and a length of the WUR preamble related to the first sequence is equal to 64 μs, and
wherein in case the synchronization sequence is a second sequence having a 64-bit length, the data rate of the payload is determined as the low data rate which is 62.5 kbps and a length of the WUR preamble related to the second sequence is equal to 128 μs.

2. The method of claim 1, wherein the first sequence is obtained based on part of the second sequence.

3. The method of claim 2, wherein the part of the second sequence is a left half of the second sequence or a right half of the second sequence.

4. A method for transmitting a wake-up radio (WUR) physical layer protocol data unit (PPDU), by an access point (AP), in a wireless LAN (WLAN), the method comprising:
determining a data rate of a payload of the WUR PPDU, wherein the data rate of the payload is determined as one of low data rate or high data rate;
configuring a synchronization sequence of a WUR preamble based on the determined data rate; and
transmitting the WUR PPDU including a legacy part, the WUR preamble and the payload,
wherein the legacy part is not decoded by the STA,
wherein a same one symbol duration is used in the WUR preamble for the low data rate and the high data rate,
wherein in case the synchronization sequence is a first sequence having a 32-bit length, the data rate of the payload is determined as the high data rate of 250 kbps and a length of the WUR preamble related to the first sequence is equal to 64 μs, and
wherein in case the synchronization sequence is a second sequence having a 64-bit length, the data rate of the payload is determined as the low data rate of 62.5 kbps and a length of the WUR preamble related to the second sequence is equal to 128 μs.

5. The method of claim 4, wherein the first sequence is a sequence capable of being obtained based on part of the second sequence.

6. The method of claim 5, wherein the part of the second sequence is a left half of the second sequence or a right half of the second sequence.

7. A station (STA) for receiving a wake-up radio (WUR) physical layer protocol data unit (PPDU) in a wireless LAN (WLAN), the STA comprising:
a WUR receiver; and
a processor configured to:
receive the WUR PPDU including a legacy part, a WUR preamble and a payload through the WUR receiver,
obtain information on a data rate of the payload based on a synchronization sequence of the WUR preamble, wherein the data rate of the payload is determined as one of low data rate or high data rate, and
decode the payload based on the information on the data rate,
wherein the legacy part is not decoded by the STA,
wherein a same one symbol duration is used in the WUR preamble for the low data rate and the high data rate,
wherein in case the synchronization sequence is a first sequence having a 32-bit length, the data rate of the payload is determined as the high data rate of 250 kbps and a length of the WUR preamble related to the first sequence is equal to 64 μs, and
wherein in case the synchronization sequence is a second sequence having a 64-bit length, the data rate of the payload is determined as the low data rate of 62.5 kbps and a length of the WUR preamble related to the second sequence is equal to 128p.

8. An access point (AP) for transmitting a wake-up radio (WUR) physical layer protocol data unit (PPDU) in a wireless LAN (WLAN), the AP comprising:
a transmitter; and
a processor configured to:
determine a data rate of to a payload of the WUR PPDU, wherein the data rate of the payload is determined as one of low data rate or high data rate,
configure a synchronization sequence of a WUR preamble based on the determined data rate, and
transmit the WUR PPDU including a legacy part, the WUR preamble and the payload,
wherein the legacy part is not decoded by the STA,
wherein a same one symbol duration is used in the WUR preamble for the low data rate and the high data rate,
wherein in case the synchronization sequence is a first sequence having a 32-bit length, the data rate of the payload is determined as the high data rate of 250 kbps and a length of the WUR preamble related to the first sequence is equal to 64 μs, and
wherein in case the synchronization sequence is a second sequence having a 64-bit length, the data rate of the payload is determined as the low data rate of 62.5 kbps and a length of the WUR preamble related to the second sequence is equal to 128 μs.

* * * * *